US010893645B2

(12) United States Patent
Neudorf et al.

(10) Patent No.: US 10,893,645 B2
(45) Date of Patent: Jan. 19, 2021

(54) MOBILE BALE AND FEED PROCESSOR AND METHOD

(71) Applicant: BOURGAULT INDUSTRIES LTD., St. Brieux (CA)

(72) Inventors: Blake Neudorf, Warman (CA); John Maltman, Dugald (CA); Pauric McNally, Castleblayney Co. (IE)

(73) Assignee: Bourgault Industries Ltd., St. Brieux (CA)

( * ) Notice: Subject to any disclaimer, the term of this patent is extended or adjusted under 35 U.S.C. 154(b) by 250 days.

(21) Appl. No.: 16/009,747

(22) Filed: Jun. 15, 2018

(65) Prior Publication Data

US 2019/0380277 A1 Dec. 19, 2019

(51) Int. Cl.
*A01F 29/09* (2010.01)
*A01F 29/00* (2006.01)
(Continued)

(52) U.S. Cl.
CPC ............ *A01F 29/005* (2013.01); *A01F 29/00* (2013.01); *A01F 29/01* (2013.01); *A01F 29/06* (2013.01);
(Continued)

(58) Field of Classification Search
CPC .......... A01F 29/09; A01F 29/01; A01F 29/06; A01F 29/005; A01K 5/005; B02C 21/02; B02C 21/026
(Continued)

(56) References Cited

U.S. PATENT DOCUMENTS 2,774,544 A * 12/1956 Rasmussen ............... B02C 9/00
                                                        241/232
2,862,668 A    12/1958 Stohsner
(Continued)

FOREIGN PATENT DOCUMENTS

CA    2282895 C    9/2001
CA    2488298 C    10/2008
(Continued)

OTHER PUBLICATIONS

TotalPatent: English machine translation of ES2360443, published on Mar. 28, 2012.
(Continued)

*Primary Examiner* — Faye Francis
(74) *Attorney, Agent, or Firm* — Bereskin & Parr LLP/S.E.N.C.R.L, S.R.L.

(57) ABSTRACT

A bale processor has a towed body that includes one or two hay bale shredders in the form of a flail drum. The bale processor is self-loading such that bales may be loaded in the processing tubs by a set of rear mounted arms and various conveyor chains. The processor also includes a grain tank, a grain metering system, and a grain cracker, all mounted in series. The grain cracker may have a choice of outputs, including back to the grain tank. The cracked grain is fed into the tub to be mixed with other feed materials, such as shredded straw, and is then discharged to the opposite side of the unit. There may be a feed chopper mounted downstream of the tub, such that the feed chopper receives both the grain material and the shredded hay feed. The feed chopper and the grain cracker operate independently, and may have different setting of size, speed, and weight or volume per minute or per unit of distance travelled. The output may have a curtain assembly to facilitate deposit in windrows.

26 Claims, 27 Drawing Sheets

(51) Int. Cl.
*A01F 29/06* (2006.01)
*A01F 29/01* (2006.01)
*A01F 29/10* (2006.01)
*B02C 21/02* (2006.01)

(52) U.S. Cl.
CPC .............. *A01F 29/09* (2013.01); *A01F 29/10* (2013.01); *B02C 21/02* (2013.01); *B02C 21/026* (2013.01)

(58) Field of Classification Search
USPC ........................................................ 241/605
See application file for complete search history.

(56) References Cited

U.S. PATENT DOCUMENTS

| | | | |
|---|---|---|---|
| 2,877,956 | A | 3/1959 | Sackett |
| 3,062,461 | A | 11/1962 | Wetmore |
| 3,208,491 | A | 9/1965 | Bliss |
| 3,275,251 | A | 9/1966 | Thompson et al. |
| 3,415,492 | A | 12/1968 | Rule |
| 3,547,358 | A | 12/1970 | Anderson et al. |
| 3,741,487 | A | 6/1973 | Kanengieter |
| 3,771,733 | A | 11/1973 | Hadley et al. |
| 3,840,189 | A | 10/1974 | Kanengieter et al. |
| 3,964,720 | A | 6/1976 | Mast |
| 4,092,004 | A | 5/1978 | Leverenz et al. |
| 4,183,472 | A | 1/1980 | Maas et al. |
| 4,330,091 | A | 5/1982 | Rozeboom et al. |
| 4,506,990 | A | 3/1985 | Neier et al. |
| 4,602,572 | A | 7/1986 | Giaier et al. |
| 4,661,365 | A | 4/1987 | Malone |
| 5,205,496 | A | 4/1993 | O'Donnell et al. |
| 5,622,323 | A | 4/1997 | Krueger et al. |
| 5,626,298 | A | 5/1997 | Arnoldy |
| 5,743,472 | A | 4/1998 | Williams et al. |
| 6,199,781 | B1 | 3/2001 | Hruska |
| 6,644,575 | B1 | 11/2003 | Farrell |
| 7,097,123 | B2 | 8/2006 | Lepage et al. |
| 7,546,966 | B2 | 6/2009 | Lepage et al. |
| 8,651,408 | B1 | 2/2014 | Fox |
| 2001/0037638 | A1* | 11/2001 | Krone .................... A01F 29/10 56/504 |
| 2010/0155513 | A1 | 6/2010 | Brick et al. |
| 2019/0174680 | A1* | 6/2019 | Neitemeier ........... A01F 29/095 |

FOREIGN PATENT DOCUMENTS

| | | |
|---|---|---|
| CA | 2511712 C | 3/2009 |
| ES | 2360443 B1 | 3/2012 |
| GB | 2298593 B | 12/1996 |

OTHER PUBLICATIONS

Mixer Wagons: TMR Kwikmixer® for Beef; THMR® Kwikmixertm® for Dairy; retrieved on Mar. 7, 2017 from http://apacheequipment.com/userfiles/file/Mixer-Literature.pdf.

Highline Manufacturing Ltd., "Bale Pro Complete Feed Ration CFR1251 Operators Manual", https://www.highlinemfg.com/ProductInformation/CurrentManuals/BaleProcessors.aspx. Accessed Jan 23, 2019.

Highline Manufacturing Ltd., "Bale Pro Complete Feed Ration CFR1251 Parts Manual", https://www.highlinemfg.com/ProductInformation/CurrentManuals/BaleProcessors.aspx. Accessed Jan. 23, 2019.

* cited by examiner

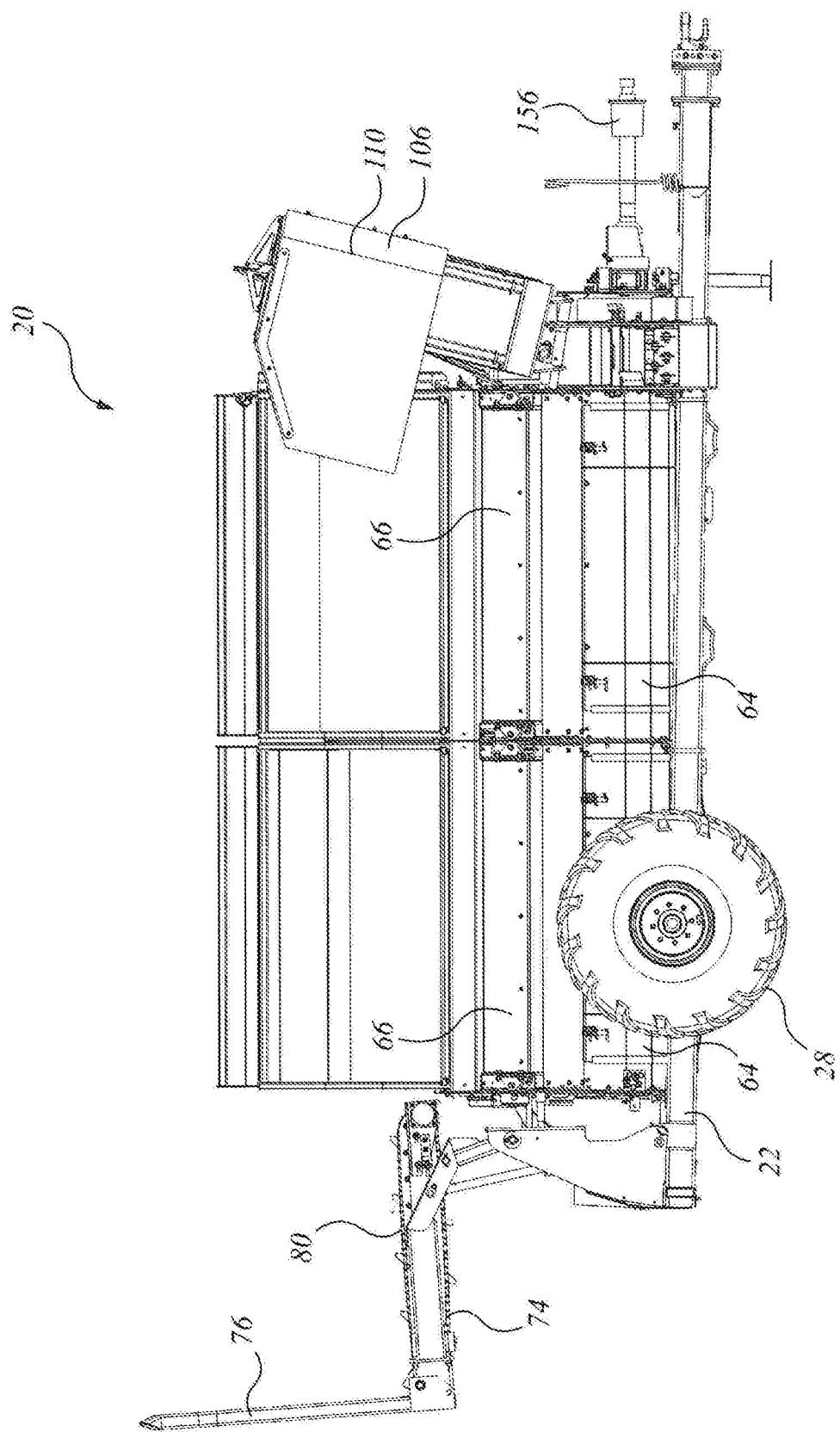

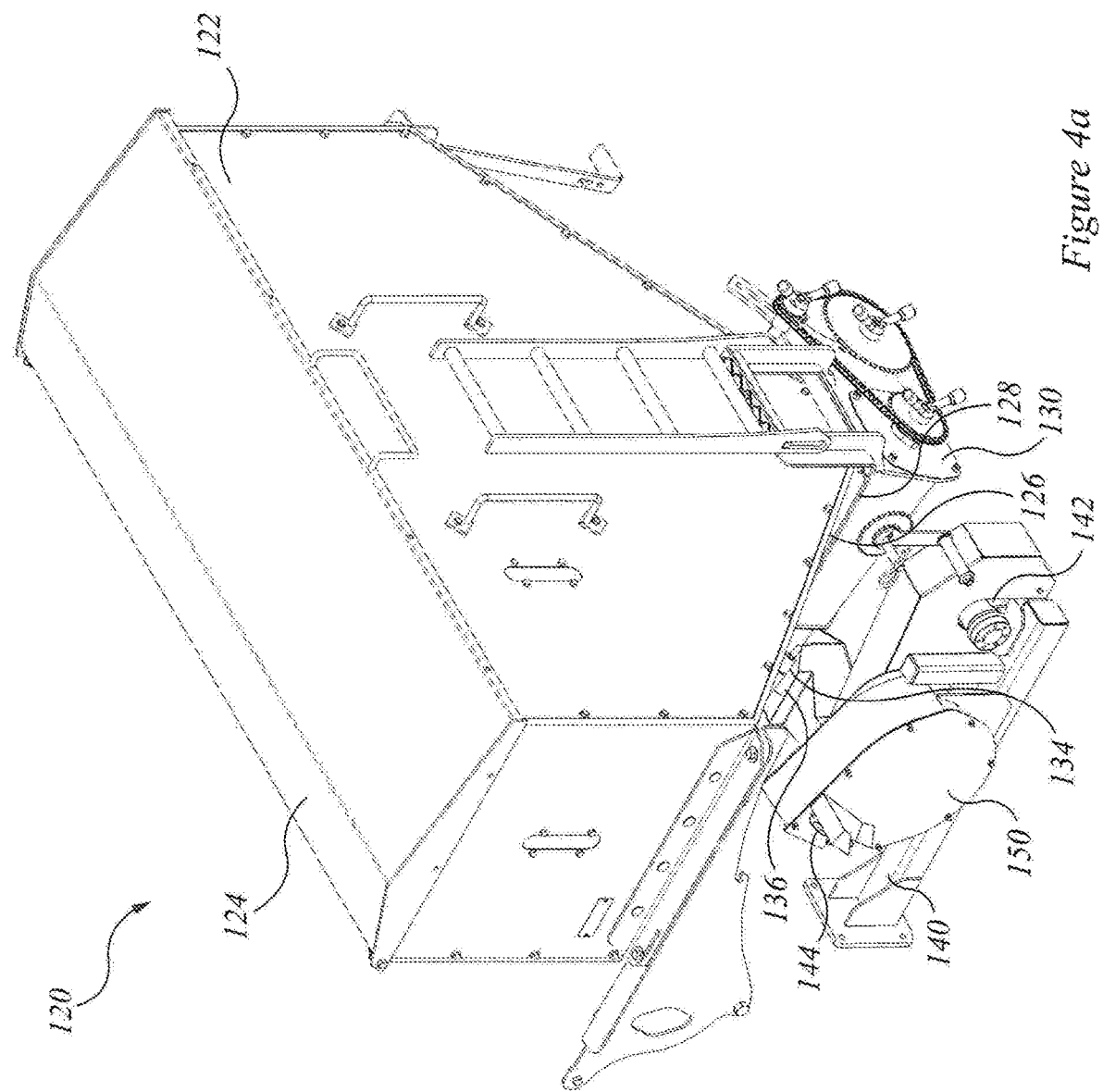

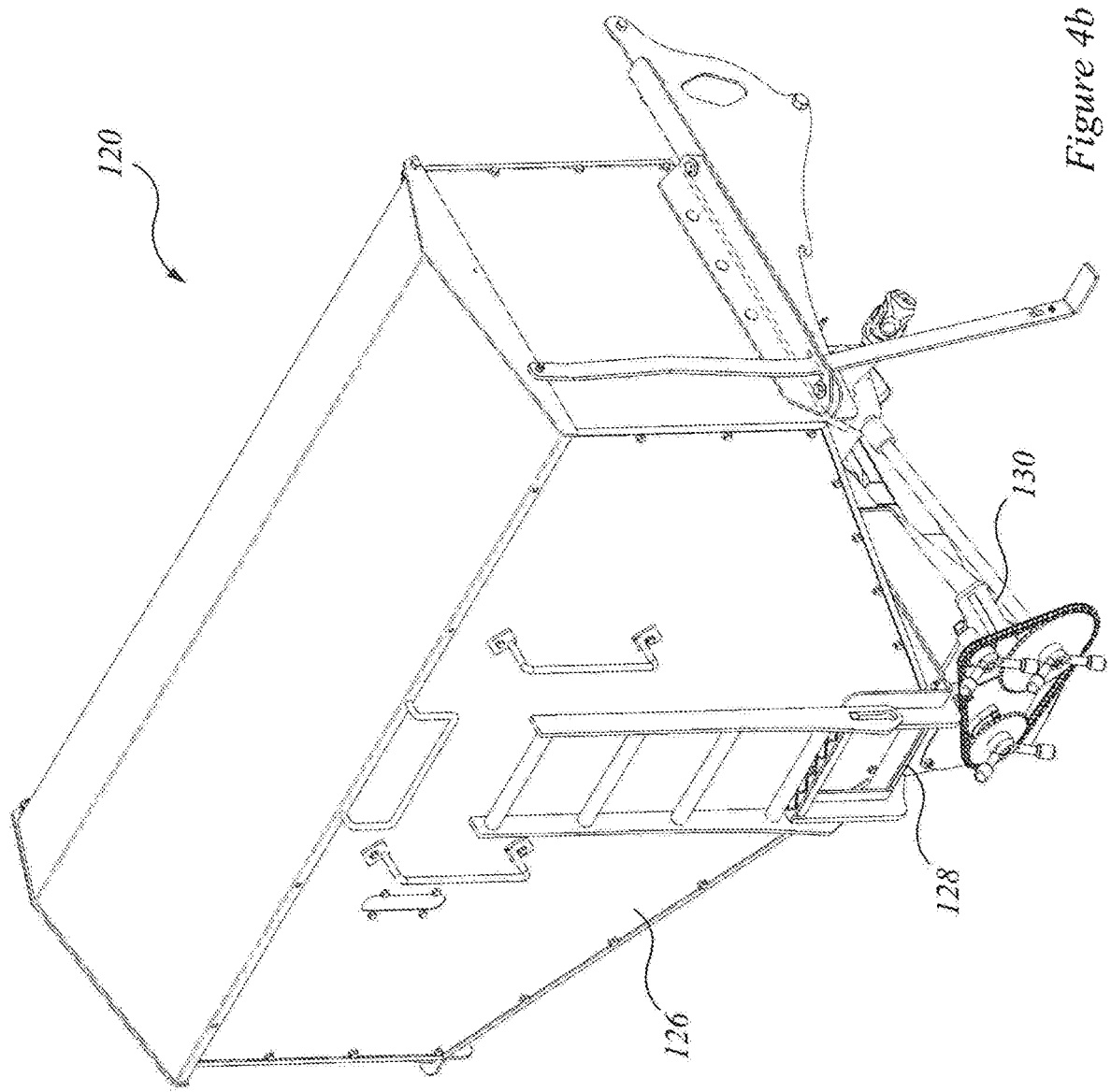

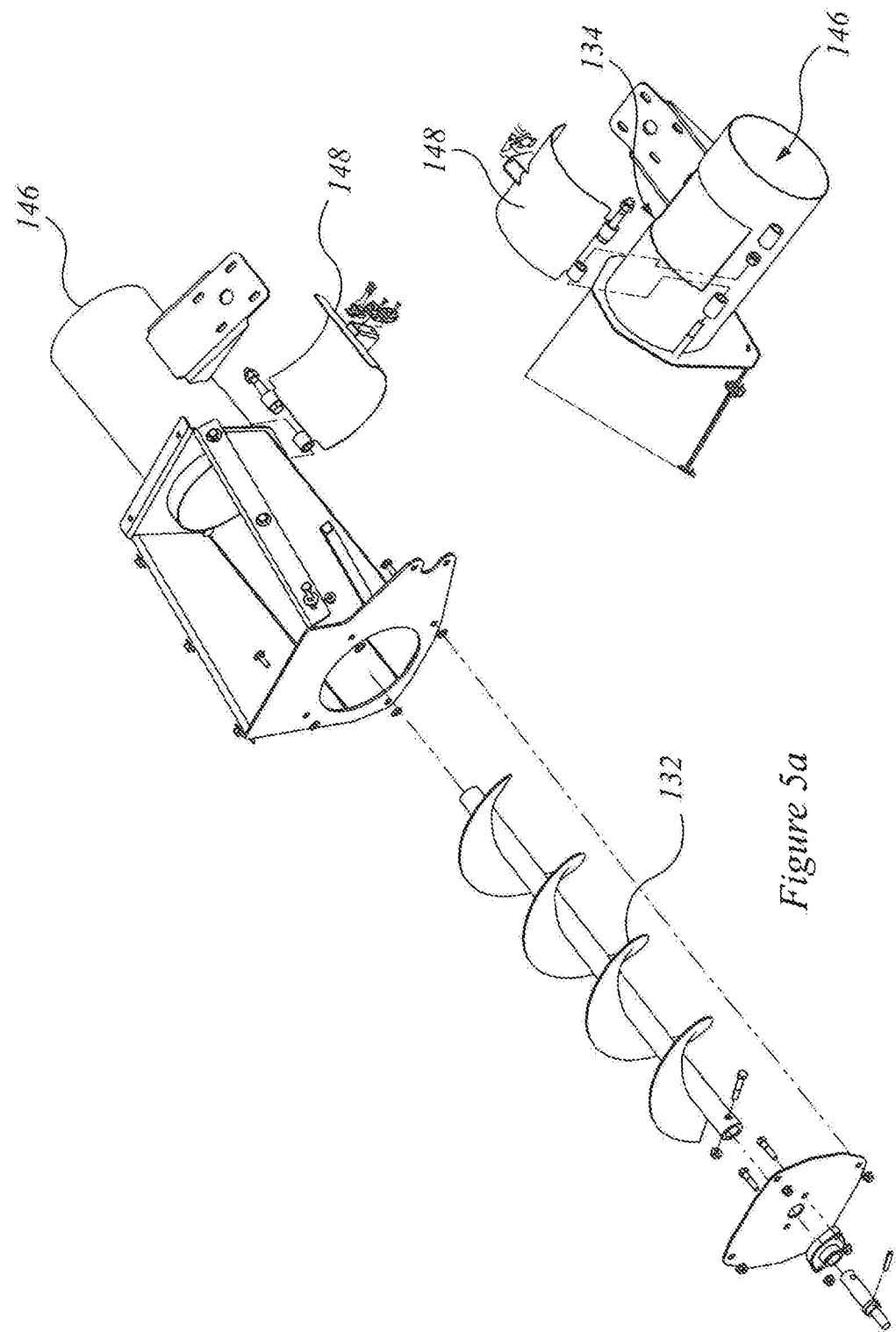

MOBILE BALE AND FEED PROCESSOR AND METHOD

CROSS-REFERENCE TO RELATED APPLICATIONS

This application claims the benefit of the filing date of U.S. Provisional Patent Application Ser. No. 62/528,653, filed Jul. 5, 2017, the disclosure of which is incorporated herein in its entirety by reference.

FIELD OF THE INVENTION

This invention relates to the field of bale processors.

BACKGROUND OF THE INVENTION

Bale processors are used to shred bales of hay, whether round or rectangular. The shredded hay may be chopped into smaller portions. Mobile bale processors may move forward as the hay is being shredded, and may deposit the shredded and chopped hay in a swath as the bale processor moves forward. Additional nutrients, in the form of grain, may be added to the hay to provide a feed mixture.

SUMMARY OF THE INVENTION

In an aspect of the invention there is a feed mixer. It has a mobile vehicular body having a bale processor. The bale processor includes a bale shredder located within the body. There is a grain tank, and a grain cracker mounted in series with the grain tank. The grain tank and grain cracker are mounted to the body and are mobile therewith. The body has a grain inlet by which to receive cracked grain independently of loading of bales.

In a feature of that aspect of the invention, the grain cracker is independently speed-adjustable. In another feature, the mixer includes a grain metering section, and the grain cracker is mounted in series with the grain metering section. In still another feature, the grain cracker is mounted downstream of the grain tank, and upstream of the grain inlet to the bale processor. In a further feature, the bale processor is self-loading. In another feature, the bale processor includes an output chopper, and the grain inlet is mounted to the body upstream of the chopper. In yet another feature, the mixer has first and second opposed sides, the mixer discharges to the first side of the body. The grain cracker is mounted on the second side of the body. In a further feature, the grain cracker and the bale processor are independently operable. In another feature, the mixer includes a feed chopper mounted downstream of the bale shredder. In an alternate feature, the grain cracker is operable to discharge cracked grain into the tank.

In another aspect of the invention there is a towed bale processor having a grain cracker and a feed chopper. The grain cracker is mounted upstream of the feed chopper.

In a feature of that aspect of the invention, the bale processor has a curtain assembly mounted to intercept discharge therefrom, such that a windrow of mixed bale material and cracked grain is deposited as the bale processor is towed forward. In another feature, the bale processor includes a bale shredder mounted upstream of the feed chopper. In still another feature, discharge from the grain cracker is comingled with discharge from the bale shredder upstream of the feed chopper. In still another feature, the bale processor has an auger. The auger conveys comingled discharge from the bale shredder and the grain cracker to the feed chopper. In yet another feature, the feed chopper and the grain cracker are independently operable. In still another feature, the bale processor has a grain tank, a grain metering system and a grain cracker mounted in series. In a further feature, the feed chopper discharges to a first side of the bale processor, and the grain cracker is mounted to a second side of the bale processor, the second side being opposite to the first side. In another feature, said bale processor has a grain tank that supplies the grain cracker. The grain cracker is operable in one mode to recycle cracked grain back to the tank.

In a further aspect of the invention there is a bale processor. It has a body, mounted on wheels, so that it can be towed in an operating travel direction. The body has a front, a rear, a first side and a second side. The body has a tub, and a bale shredder mounted within the tub. A bale loader is mounted at the rear of the bale processor and is operable to load a bale into the tub for processing by the bale shredder. A grain tank, a grain metering system, and a grain cracker are mounted to the tub. The grain tank, the metering system, and the grain cracker are mounted in series, and have at least a first discharge into the tub. The body has a side discharge whence mixed shredded material and cracked grain from the tub are deposited to form a windrow as the bale processor is towed.

In a feature of that aspect of the invention, the side discharge emanates from the first side of the towed body, and the grain tank, the metering system, and the grain cracker are mounted otherwise than to the first side of the towed body. In another feature, the bale processor has a feed chopper mounted to receive mixed shredded material and cracked grain. In a further feature, the grain cracker and the feed chopper are independently operable. In still another feature, the feed chopper is laterally fed, and laterally discharging. In still another feature, the bale processor has a discharge curtain assembly mounted thereto to form a windrow adjacent to the bale processor as the bale processor advances. In a yet further feature, the bale processor has a feed chopper and an auger, the auger being mounted to collect comingled output from the bale shredder and the grain cracker.

In another aspect of the invention there is any combination of any of the features of any one of the embodiments shown or described herein, in combination with the features of any other embodiment, except to the extent those features are mutually exclusive. In another aspect of the invention, there is any apparatus substantially as shown or described herein, in whole or in part.

BRIEF DESCRIPTION OF THE DRAWINGS

These aspects and other features of the invention can be understood with the aid of the illustrative figures showing a number of exemplary, and non-limiting, embodiments of the principles of the invention in which:

FIG. 2a is a left-hand side view of the bale processor of FIG. 1a;

FIG. 2b is a right-hand side view of the bale processor of FIG. 1a;

FIG. 2c is a front view of the bale processor of FIG. 1a;

FIG. 2d is rear view of the bale processor of FIG. 1a;

FIG. 2e is a top view of the bale processor of FIG. 1a;

FIG. 2f is a bottom view of the bale processor of FIG. 1a;

FIG. 3c is an exploded detail of the feed chopper of the body structure of FIG. 3a;

FIG. 4a is a general arrangement view of a grain tank and grain cracker installation of the bale processor of FIG. 1a from the left, in front, and above;

FIG. 4b is a general arrangement view of the grain tank installation of FIG. 4a from the left and behind the bale processor;

FIG. 4c is a bottom view of the grain tank of FIG. 4a;

FIG. 4d shows an alternate embodiment of a grain cracker to that of FIG. 4a;

FIG. 5a is an exploded perspective view of a metering auger of the grain tank installation of FIG. 4a;

FIG. 5b is a perspective view of an underside detail of the metering auger of FIG. 5a;

FIG. 6a is a view of an alternate embodiment of a bale processor to that of FIG. 1a;

FIG. 6d is a top view of the bale processor of FIG. 6a;

FIG. 8c is a left side view of the grain tank of FIG. 8a; and FIG. 8d is a top view of the grain tank of FIG. 8a.

DETAILED DESCRIPTION

Figure 1A:
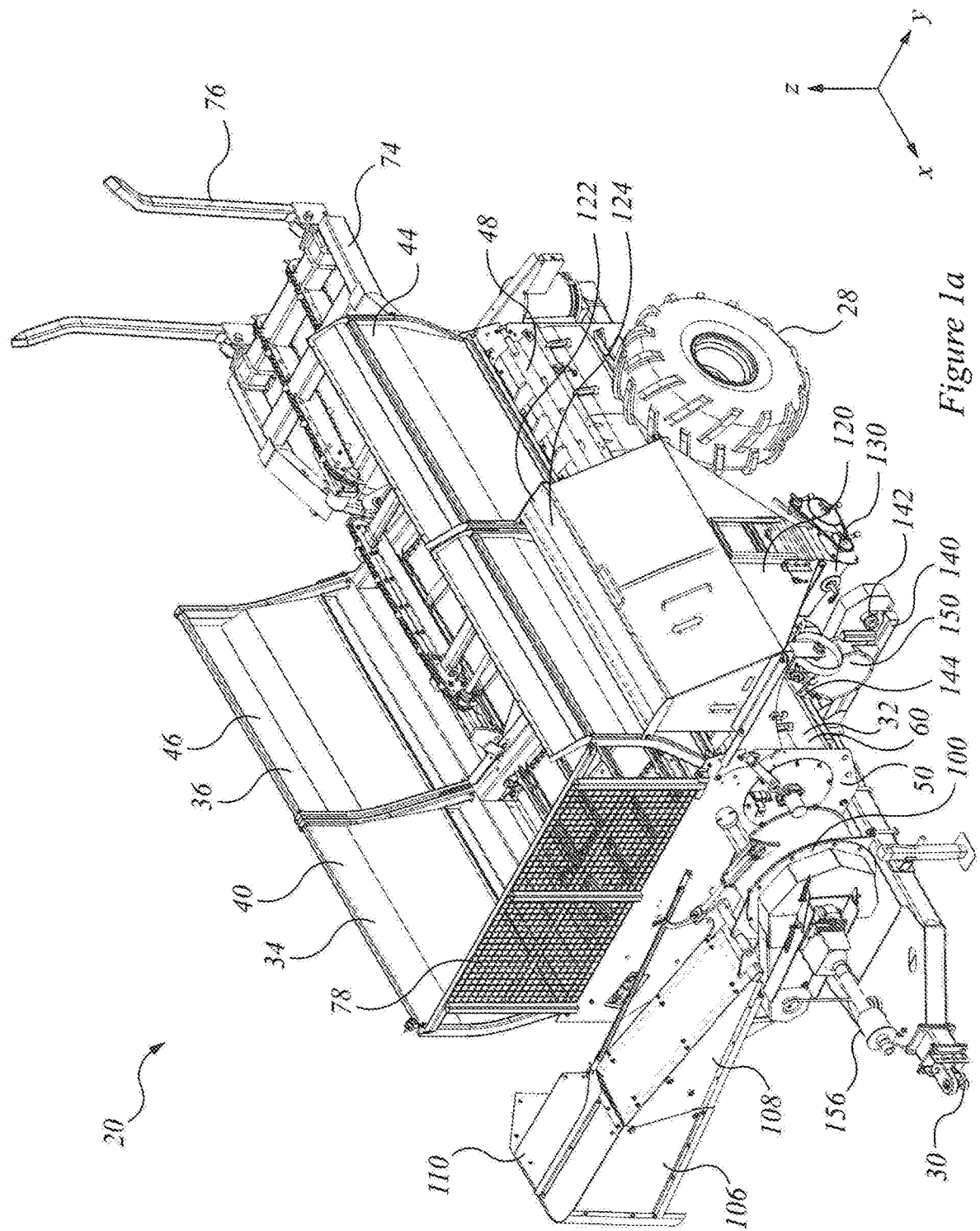
FIG. 1a shows a general assembly perspective view of a bale processor from in front, to the left, and above.
Figure 1B:
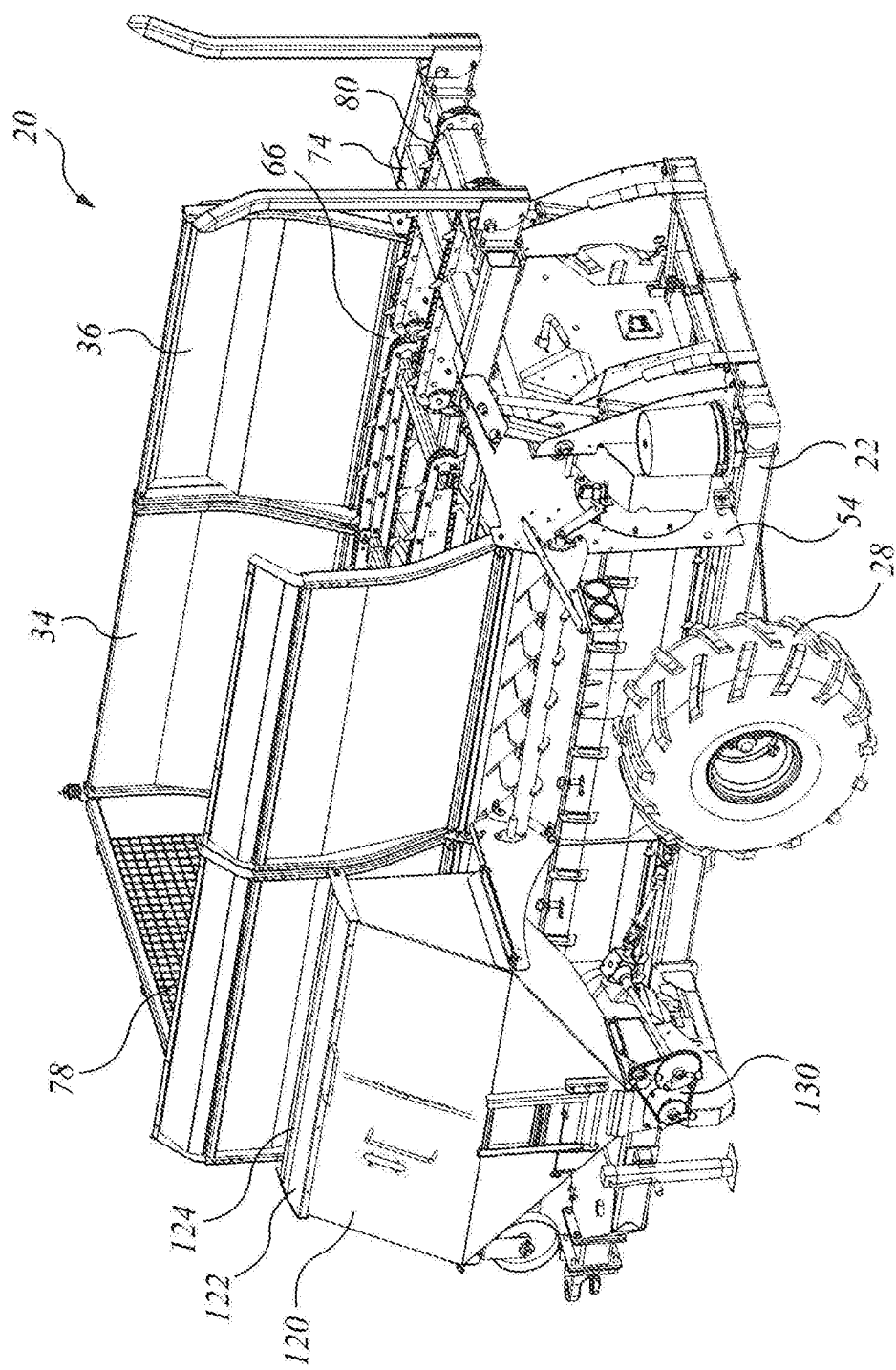
FIG. 1b is a general perspective view from the left and rear of the bale processor of FIG. 1a showing a grain tank installation.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification may be translated, without being limited to specific words or phrases.

For the purposes of this description, it may be that a Cartesian frame of reference may be employed in which the long, or largest, dimension of an object may be considered to extend in the direction of the x-axis, and the height of the article may be measured in the vertical, or z-direction. Accordingly, as indicated in FIG. 1a, the length of the bale processors herein may be designated as the x-direction; and the height may be arbitrarily designated as the z-direction. The cross-wise, or transverse direction may be identified as the y-direction. Unless noted otherwise, the terms "inside" and "outside", and "inwardly" and "outwardly", refer to location or orientation relative to the bale processor body. The engineering terms "proud", "flush", and "shy" may denote items that, respectively, protrude beyond an adjacent element, are level with an adjacent element, or do not extend as far as an adjacent element, the terms corresponding conceptually to the conditions of "greater than", "equal to", and "less than". The terms "upstream" and "downstream" may be used in the context of elements that are mounted to function on, or to process, a flow of work material. The inlet of such a process or stage is the upstream end, and the outlet or discharge is the downstream end. Work product flows from upstream elements toward downstream elements, whatever the mechanical morphology of their physical layout may be.

Referring to FIGS. 1a-5b, by way of a general overview, a bale processor is shown generally as 20. It includes a frame or body 22 that is carried on an undercarriage 24 that includes an axle 26 and wheels 28. While bale processor 20 may in some embodiments be self-propelled, in the embodiment shown, the leading end of frame 22 includes a hitch 30 by which bale processor 20 is to be towed. Reference may be made to the Highline Manufacturing Ltd. Combined Feed Ration CFR 1251 Bale Pro™ bale processor, and to the on-line parts manuals at: www.highlinemfg.com/ProductInformation/ProductManuals/BaleProcessors.aspx., which to any extent necessary or helpful are incorporated herein by reference. The wheel width of the embodiment shown may meet the requirements for towing on a public highway such that body 22 is a towed, or towable, body. In general appearance, the body is predominantly rectangular as seen from above, the length of the body being greater than the width, being roughly twice as long in the body, and three times as long overall from the towing hitch to the rearwardly extending lift forks 76. Bale processor 20 has a bale shredder 68 for shredding bales of hay, and a grain delivery system 120 by which to add feed supplements to the hay. In this description, bale processor 20 combines bale material, or bale materials with an additive, or feed supplement to produce a mixed feed. Typically, the bale material is predominantly or entirely hay or straw. The feed supplement is typically grain, which may be cracked grain. For simplicity, the term "grain" is used generically throughout the specification, although the "grain" may mean grain, alone, or grain in combination with and other additional small feed materials, as may be. An independent grain cracker 150 is mounted in series as part of the grain delivery system, to pre-crack grain before it is mixed with the shredded hay. It is mounted as an integral part of bale processor 20, travels with the vehicle, and is operable in various modes (described below) whether the vehicle is moving or stopped. Bale processor 20 may also include a feed chopper 100 located downstream of shredder 68 and grain cracker 150. Grain cracker 150 and feed chopper 100 are independently operable.

In the embodiment shown, bale processor 20 has a body or bed 32 carried on frame 22. Bed 32 includes a first accommodation, or bin, or hopper or tub 34 located at the forward end of body 22, and a second accommodation or bin, or hopper, or tub 36 located rearwardly of tub 34. Tub 34 has first and second, or left and right hand side walls 38, 40, and a forward bulkhead, or end wall 50. Tub 36 has corresponding side walls 44, 46 that extend rearwardly of side walls 38, 40 respectively. Side walls 38, 40, 44 and 46 may have a generally outward and upward curvature, and are spaced apart laterally such that accommodations 34 and 36 have an appropriate size for receiving a round bale of hay. A generally rectangular bale will also fit within this accommodation. Bed 32 includes a front wall, or forward shear panel, or forward bulkhead 50, a middle shear panel, or middle wall, or middle bulkhead 52, and a rear wall or shear panel, or bulkhead 54. Front wall or bulkhead 50 has an upper screen 78.

Left hand side walls 38, 44 include a main wall portion 56 that is fixed between bulkheads 50 and 52 (in the case of tub 34) and between bulkheads 52 and 54 (in the case of tub 36); an upper panel, or upper wall extension, or portion that stands upwardly away from it; and lower panel, or flail drum guard, or flail drum side door 60 that is removable. Main wall portion 56 has a generally V-shaped form, set on its side, with a lower portion that extends inwardly and upwardly, and an upper portion that is sloped upwardly and outwardly. A guard rod adjustment assembly 48 nests in the V shape.

Bed 32 further includes a longitudinal bottom containment wall 62, and a longitudinal curved-section panel, or wall, or shroud, identified as auger side panel 64. Bed 32 also has a fixed right hand side member, or wall, or panel, identified as dual, bent right hand tub wall 66. All of items 62, 64, and 66 extend between bulkheads 50 and 52 (in the case of tub 34); or 52 and 54 (in the case of tub 36). Access panels, i.e., flail drum side doors 60, are removable to permit maintenance of the flail drum 70.

A bale drive or feeder, or conveyor, or set of transfer chains 72 is mounted in each of tubs 34 and 36, and in each case is operable to advance, or feed, bales laterally toward flail drum 70. The rearward end of body 22 is open in the axial direction to permit loading of bales. A bale loader 74 is mounted rearwardly outboard of the open rearward end. Bale loader 74 has a pair of extending lifting arms 76, and a length-wise feeding two chain conveyor 80. Bale loader 74 is movable to lift and rotate, such that conveyor 80 is positioned to advance a newly loaded bale onto lateral conveyor chains 72. Accordingly, bale loader 74 is operable to lift or otherwise receive bales, and to advance those bales into body or bed 32, and into tubs 34 and 36 as may be. A lateral transfer chain assembly 88 includes a wall, or panel, or sheet 98 that is sloped laterally downwardly toward flail drum 70, such that bale materials loosened from bales fed by transfer chains 72 may be biased to move toward flail drum 70.

Bed 32 of bale processor 20 includes a bale shredding apparatus, or bale shredder, 68 that includes rotating shredders, namely flail drums 70. Flail drum 70 may have the form of a large, hollow cylindrical tube mounted for rotation about its long axis. Flail drum 70 is driven by a drive chain, or drive transmission 90, having an input shaft 156 that, in use, is typically connected to, and driven by, a power take-off (PTO) shaft of the towing vehicle, such as a tractor. An array of blades or cutting knives, or pivotally mounted hammers or flails 84 are mounted to the cylinder or drum 70. When a bale is advanced into first tub 34, and drum 70 is driven to rotate, the effect of knives or flails 84 is to shred the bale. The lower panel of main wall portion 56, flail drum side doors 60, and the start of bottom containment wall 62 function to form a containment boundary, or manifold, or shroud, or path, or channel, around flail drum 70, with an inlet at the top, and an outlet at the bottom. The shredded material tends then to be thrown by the flails 84 along bottom containment wall 62 toward output auger 96. Shredded material falls or flows downward to collect within the lower region of body or bed 32, the lower body panels (panel 62, auger side panel 64, flail drum side doors 60), in effect form a catchment or funnel of inclined sheets, with a slope biased to carry shredded material toward auger 96.

An outfeed assembly 94 is mounted at the lowermost region of catchment 92. Outfeed assembly 94 includes a conveyor in the form of output auger 96 which carries the shredded material forward through the front bulkhead penetration and into a chamber containing a blower or fan fixedly mounted to the front of the auger. This fan or blower transfers the material into the discharge processor, or feed chopper 100, mounted to the front end of frame 22. Auger 96 is mounted parallel to the operating travel direction of bale processor 20, and, in operation, works to draw shredded material forward toward front bulkhead 50, this process being aided by the curved form of auger side panel 64.

Figure 1C:
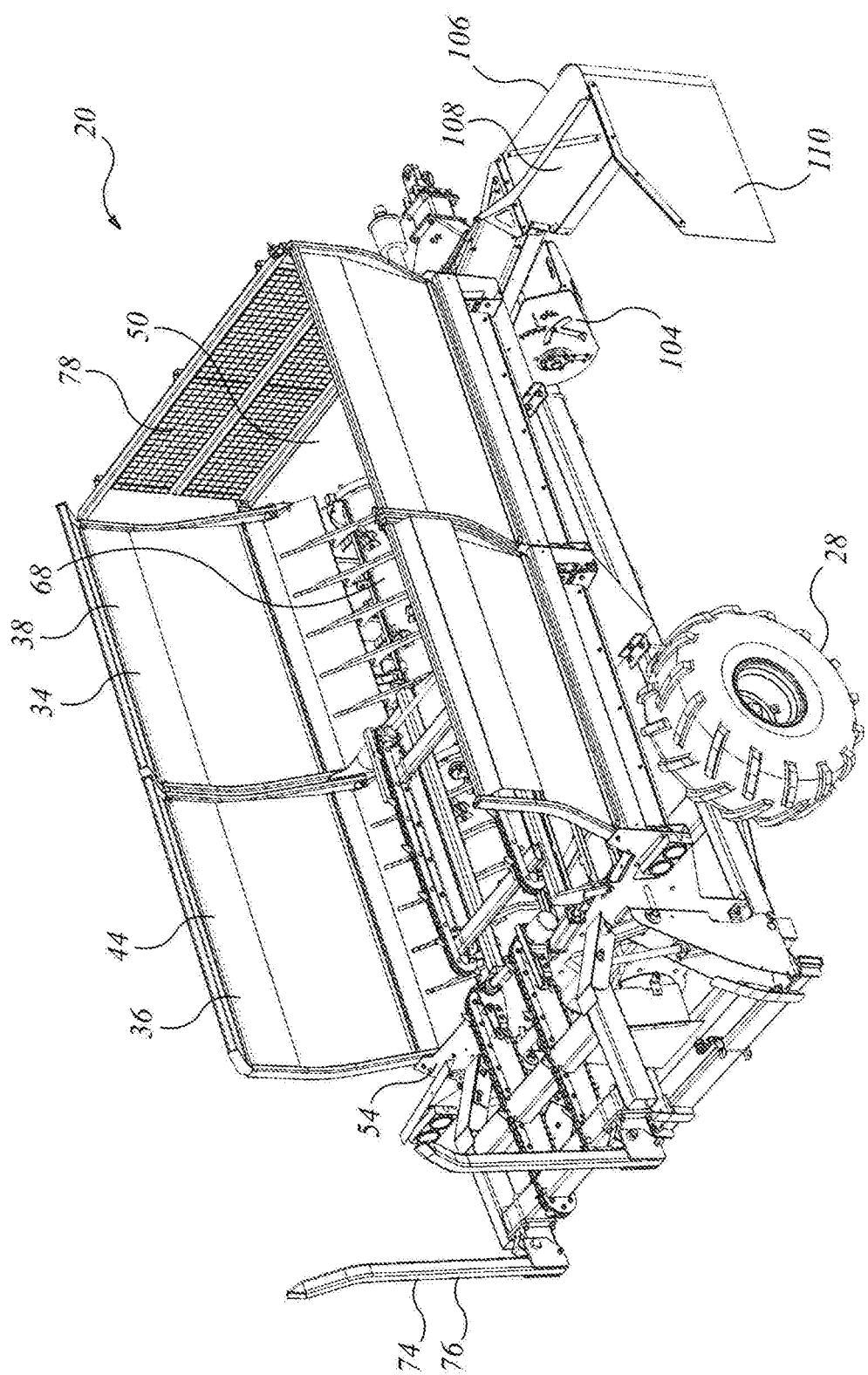
FIG. 1c shows a general perspective view of the bale processor of FIG. 1a from behind, above, and to the right.
Figure 2A:
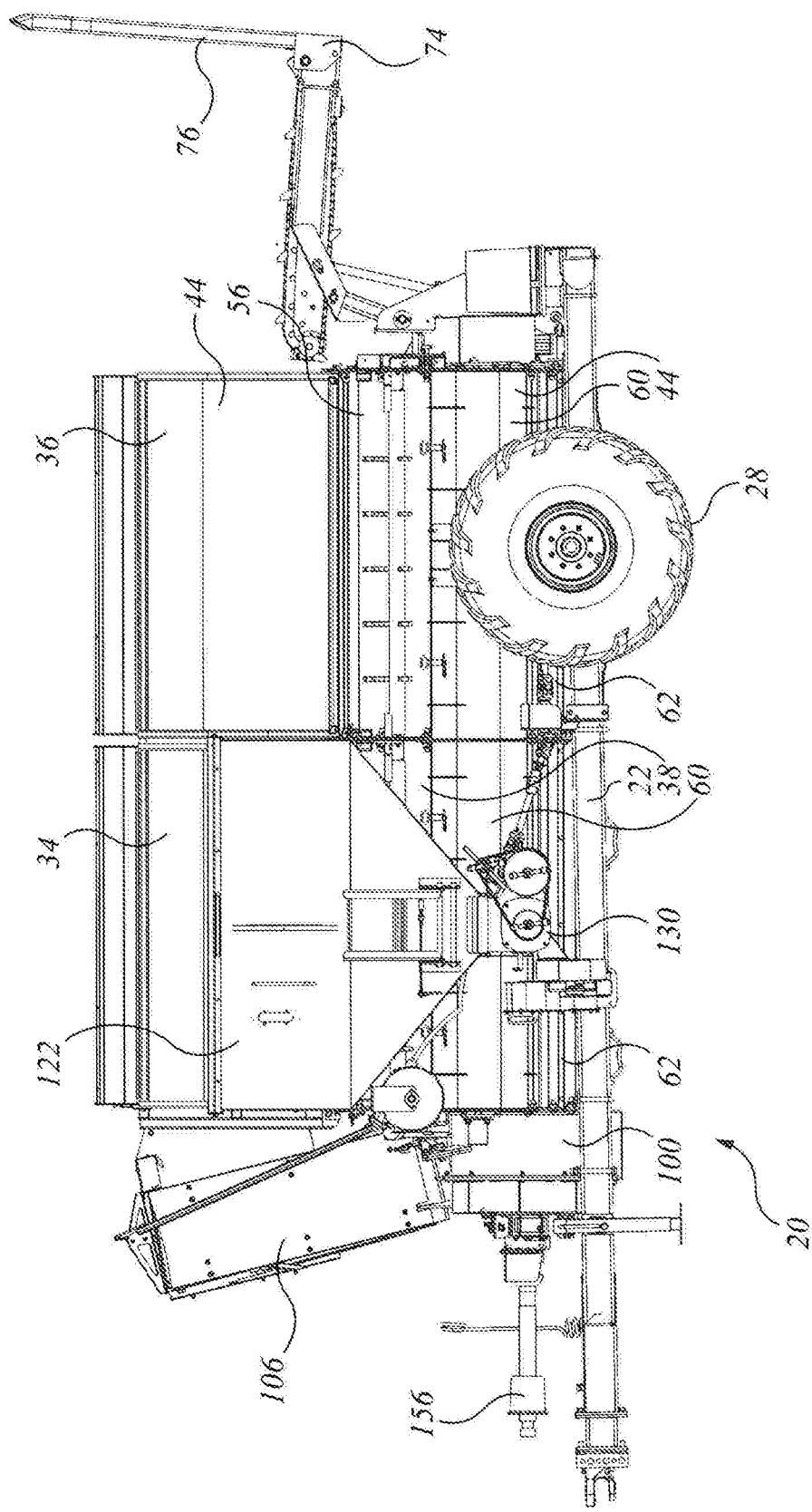
Figure 2C:
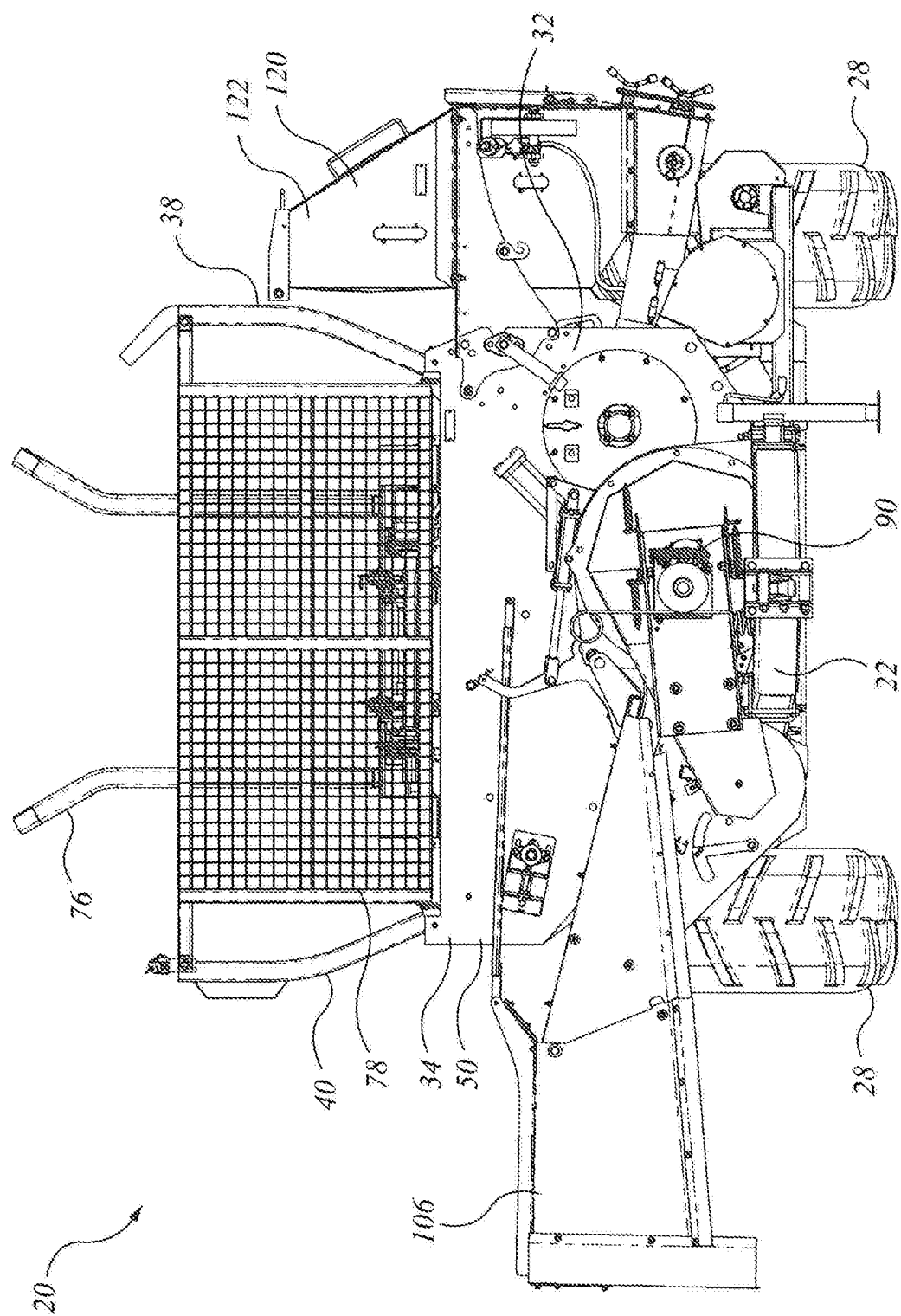
Figure 2D:
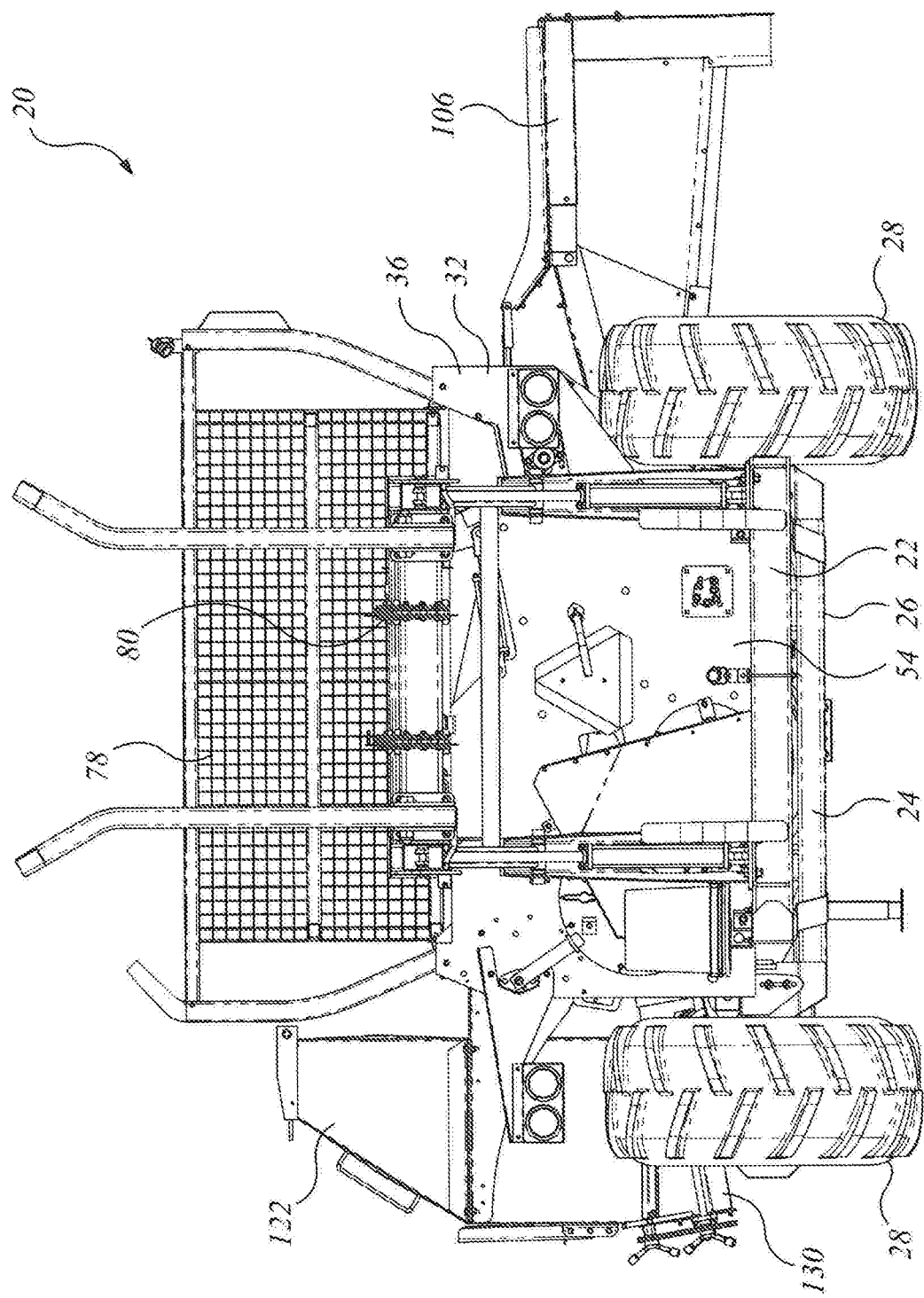
Figure 2E:
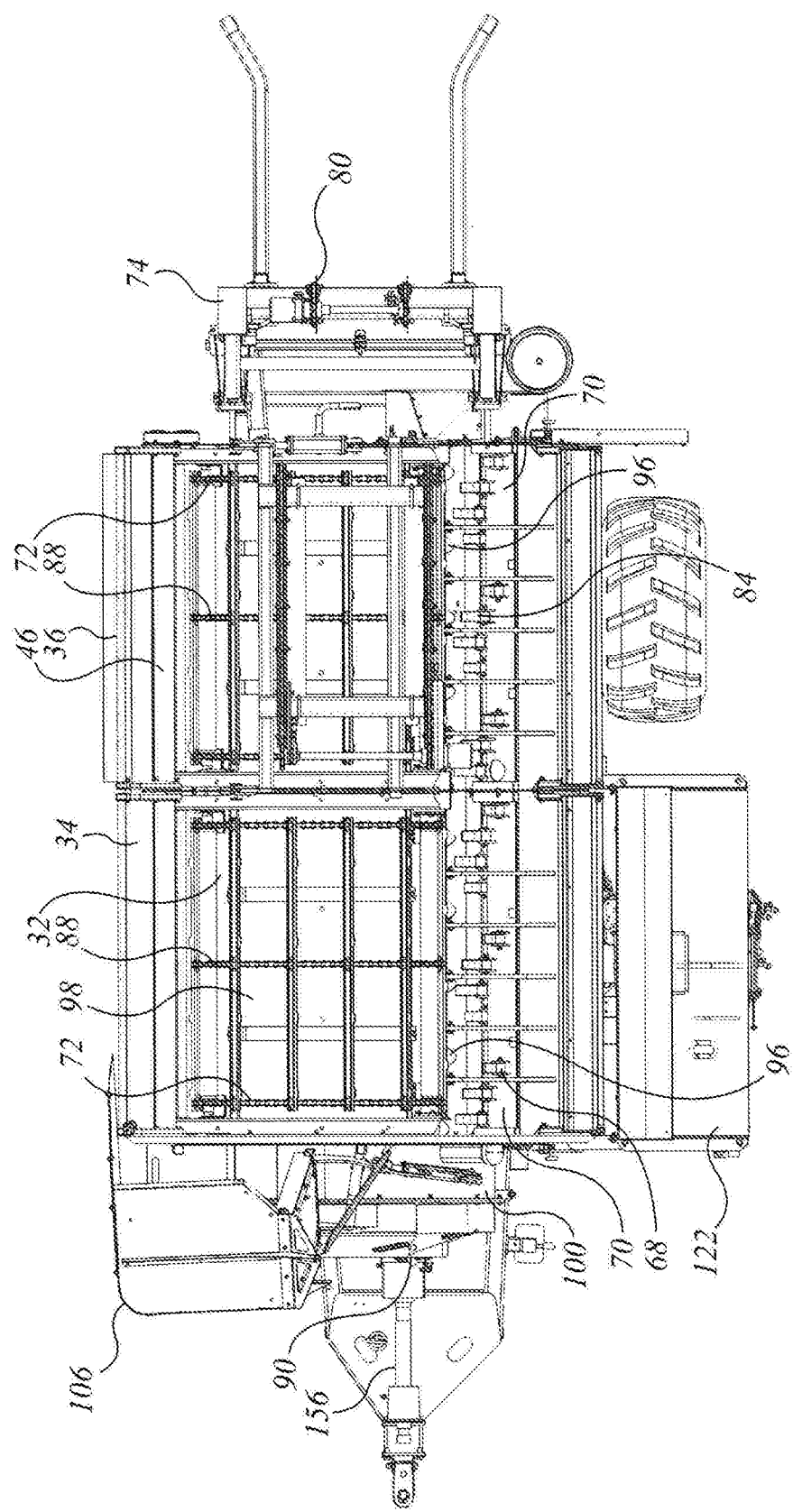
Figure 2F:
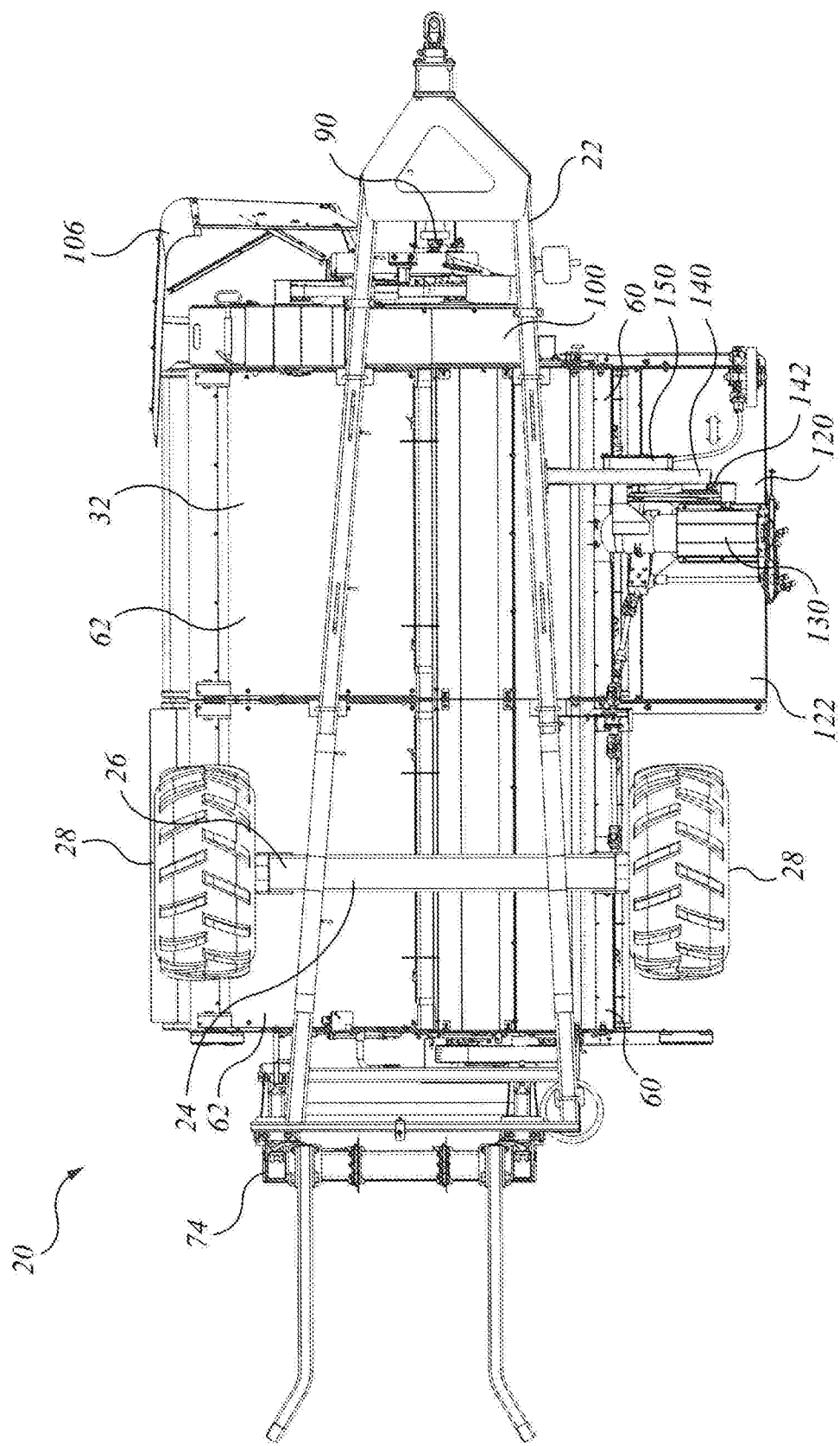
Figure 3A:
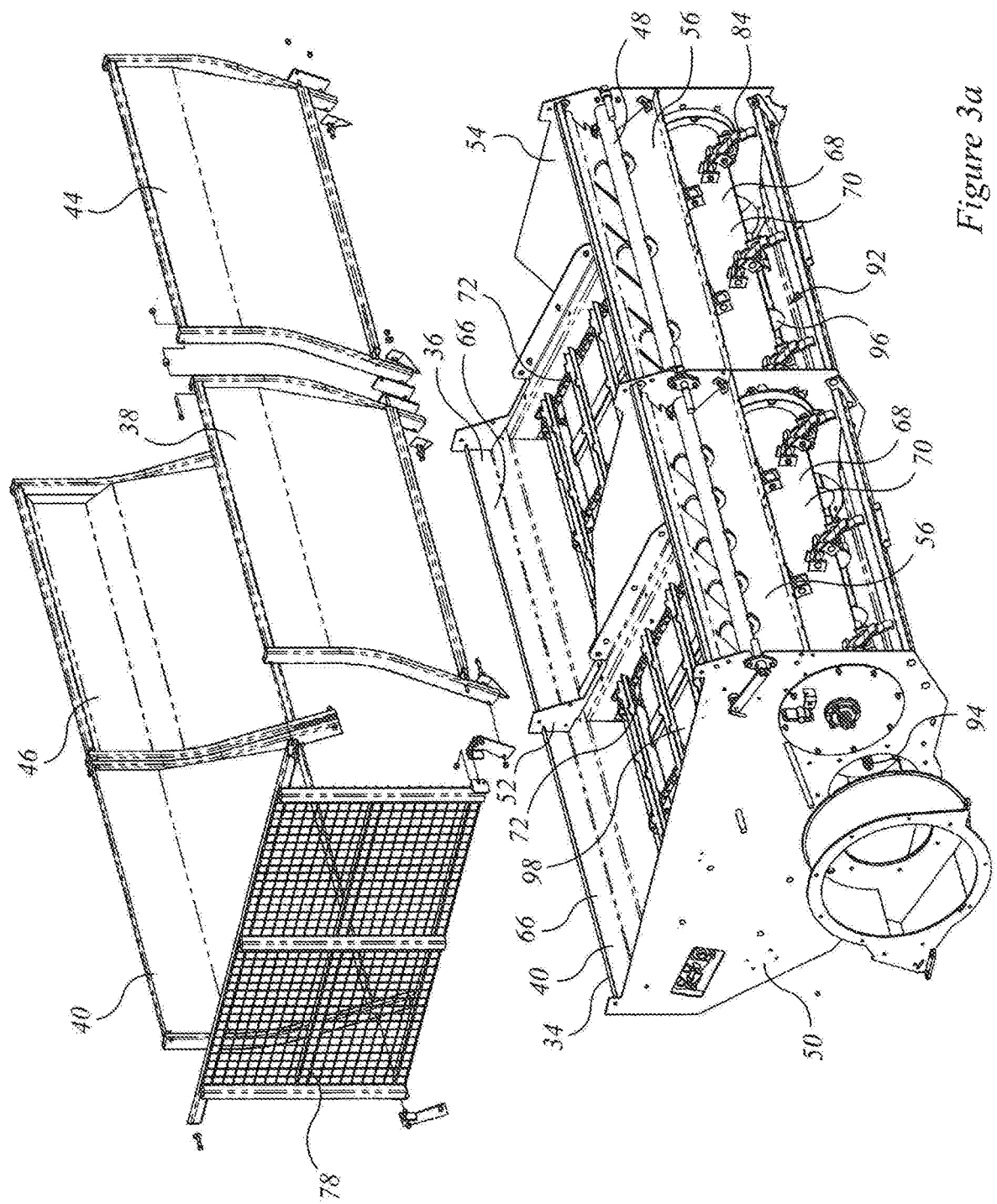
FIG. 3a is a partially disassembled perspective view of the body structure of the bale processor of FIG. 1a from the front left.
Figure 3B:
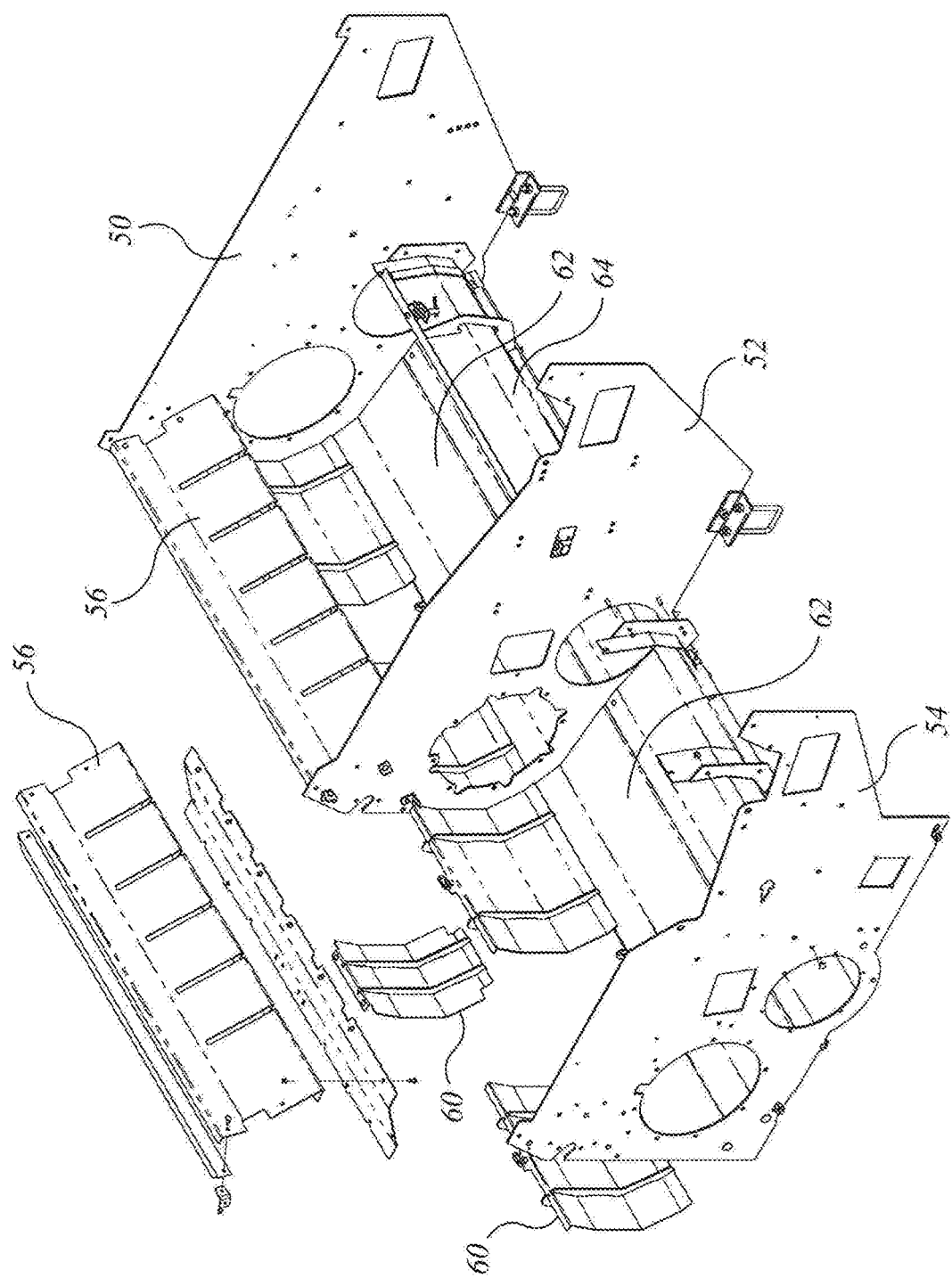
FIG. 3b is an exploded perspective view of the bale processor of FIG. 1a from the right rear of main body structure.
Figure 3C:
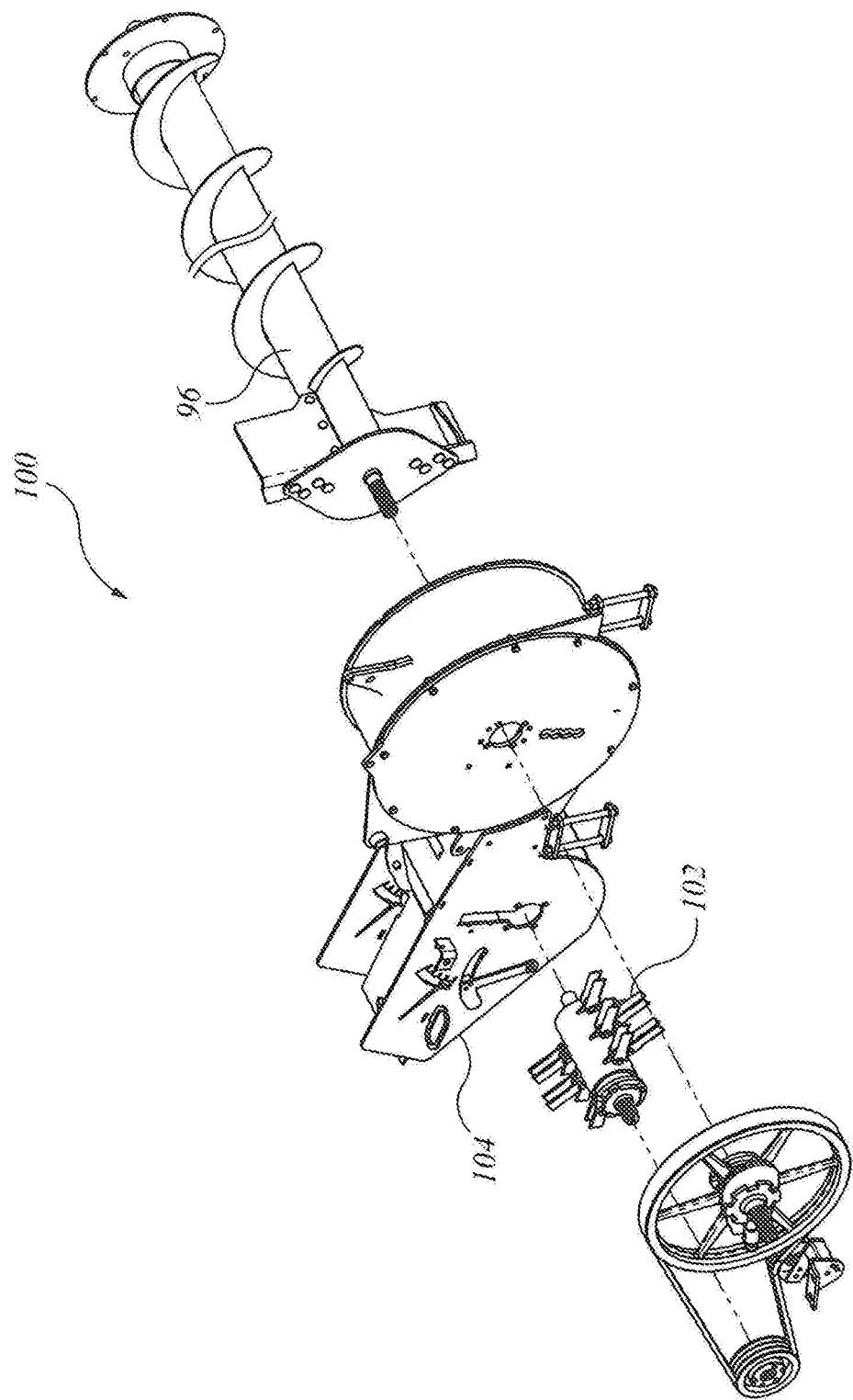

Feed chopper 100 includes a discharge chute 104, seen in FIG. 1c. As feed chopper 100 operates, its knives or blades or flails 102 function somewhat like the blades of a lawnmower or a straw chopper, and chop up the incoming feed. They also impart momentum to the feed, thereby tending also to throw it so that it exits via an adjustable discharge nozzle, or chute, or door 104.

So that the discharge may not be spread excessively, or may be deposited into a windrow as bale processor 20 is drawn forward, bale processor 20 may include a vane, or shroud, or cowling, or deflector, or trap, or shield, or curtain assembly 106 that may tend to cause the output flow to be deposited laterally outside the path of the wheel track of the vehicle in a relatively consistent swath or windrow a few feet wide. Curtain assembly 106 may have the form of a cantilevered arm or shroud 108 that extends sideways outboard, and has a bent arm, or flap, or wall, or curtain 110 blocking the output from being thrown further outboard. Curtain assembly 106 may be pivotally movable between a deployed position as shown in FIGS. 1a, 1c, 2c, and 2d, and a raised, or stored position as shown in FIGS. 2a, 2b, 2e and 2f, in which it is pivoted laterally inboard, such as may be suitable when towing bale processor 20 along a road.

Bale processor 20 may also include a feed supplement system, or grain delivery system 120, operable to mix grain feed with the hay as it is being shredded and discharged. Grain delivery system 120 may be mounted to the left hand side of the unit, outboard of wall 38. That is, when the discharge is on the right hand side of the machine, it may be helpful to have the grain input on the opposite side, being the left hand side in the embodiment shown. Grain delivery system 120 may be mounted toward the front of tub 34. It includes a reservoir, or storage vessel, or grain tank 122 that is top-opening, as a lid 124, at which grain or other feed is introduced, and a lower, convergent discharge section 126 at which there is an outlet 128. Outlet 128 gives onto a metering system 130 that carries grain from outlet 128 to bale shredder 68, where it is mixed. The mix then reaches outfeed assembly 94 of bale processor 20 more generally. Metering system 130 includes an auger 132 that turns as bale processor 20 advances, i.e., it has a feed rate that is proportional to the speed of rotation of the wheels. In one embodiment auger 132 is geared to the motion of wheels 28, such that a fixed rate of grain (or other feed) is dispensed per unit of distance advanced over the ground. In other embodiments, auger 132 may be geared to advance at a fixed rate relative to auger 96. Auger 96 is ultimately driven by the tractor PTO. In yet another embodiment, auger 132 may be driven by means of a hydraulic motor powered by the tractor's hydraulic system and metering controlled via ground speed sensing or a fixed rate relative to auger 96.

Figure 4C:
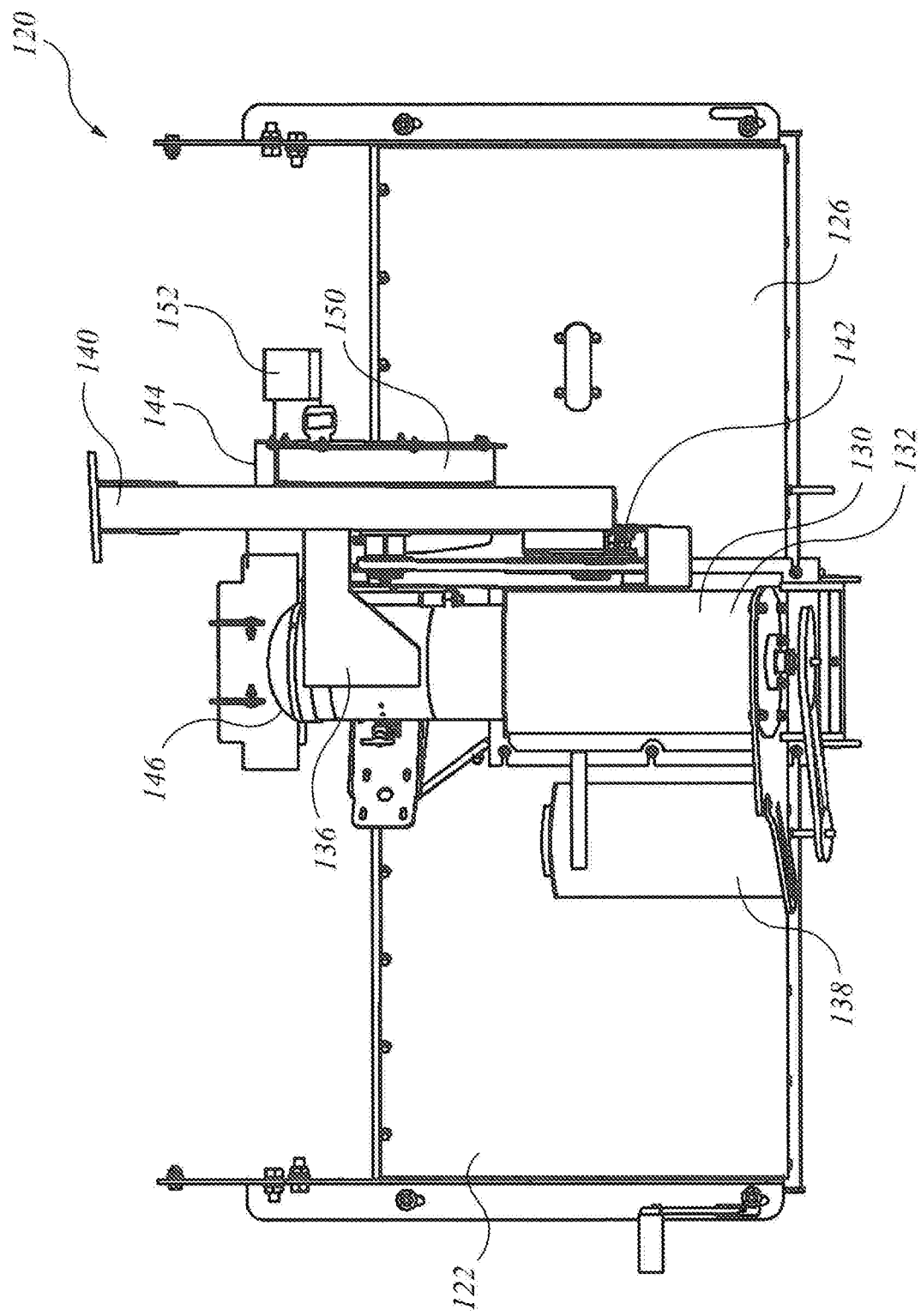

In the embodiment shown, a grain cracker 150 is mounted to body 32 of bale processor 20. Grain cracker 150 is mounted in series with grain delivery system 120 and auger 132. Auger 132 is driven through sprockets and chains. In an alternate embodiment, auger 132 may be driven through sheaves and a belt by motor 138. In the embodiment shown, grain cracker 150 is between metering system 130 and tub 34. That is, grain leaving metering system 130 through ducting, or passage, or outlet 134 falls or slides by gravity into inlet chute 136 of grain cracker 150, where it is split or cracked. Once split or cracked, the grain is blown into body 22 of bale processor 20, and, in due course, is carried into auger 96. As seen in FIG. 1a and FIG. 4c, a mounting arm, or bracket 140 extends from the left hand rail of the frame or undercarriage 24. Cracker motor 142 and cracker 150 are mounted to bracket 140, with motor 142 being outboard of cracker 150. Cracker 150 is belt-driven by motor 142. Cracker outlet 144 is ducted into first, or forward, tub 34, such that the cracked grain is carried through outlet 144 into tub 34, where it can collect, and be mixed with, the shredded hay. The mixture is then carried forward to feed chopper 100, and discharged through chute 104.

In an alternate mode of operation, where the operator wishes merely to crack a certain amount of grain, outlet 144 of grain cracker 150 may have a cut-off door or discharge port 160, and a vane or valve or gate 168 that is adjusted to direct output from grain cracker 150 through port 160 rather than through outlet 146. Un-mixed, cracked grain leaving port 160 may then be retrieved for such use as may be desired from downwardly opening auxiliary outlet chute 152, where it may be collected in a suitable container.

In a further alternate mode of operation, grain cracker 150 can be bypassed by closing outlet 144 and opening alternate outlet 146 to permit grain to be fed directly from metering system 130 into tub 34, if desired. Appropriate gates or movable vanes 148 (FIGS. 5a, 5b) permits selection of outlet 144 or outlet 146.

Figure 4D:
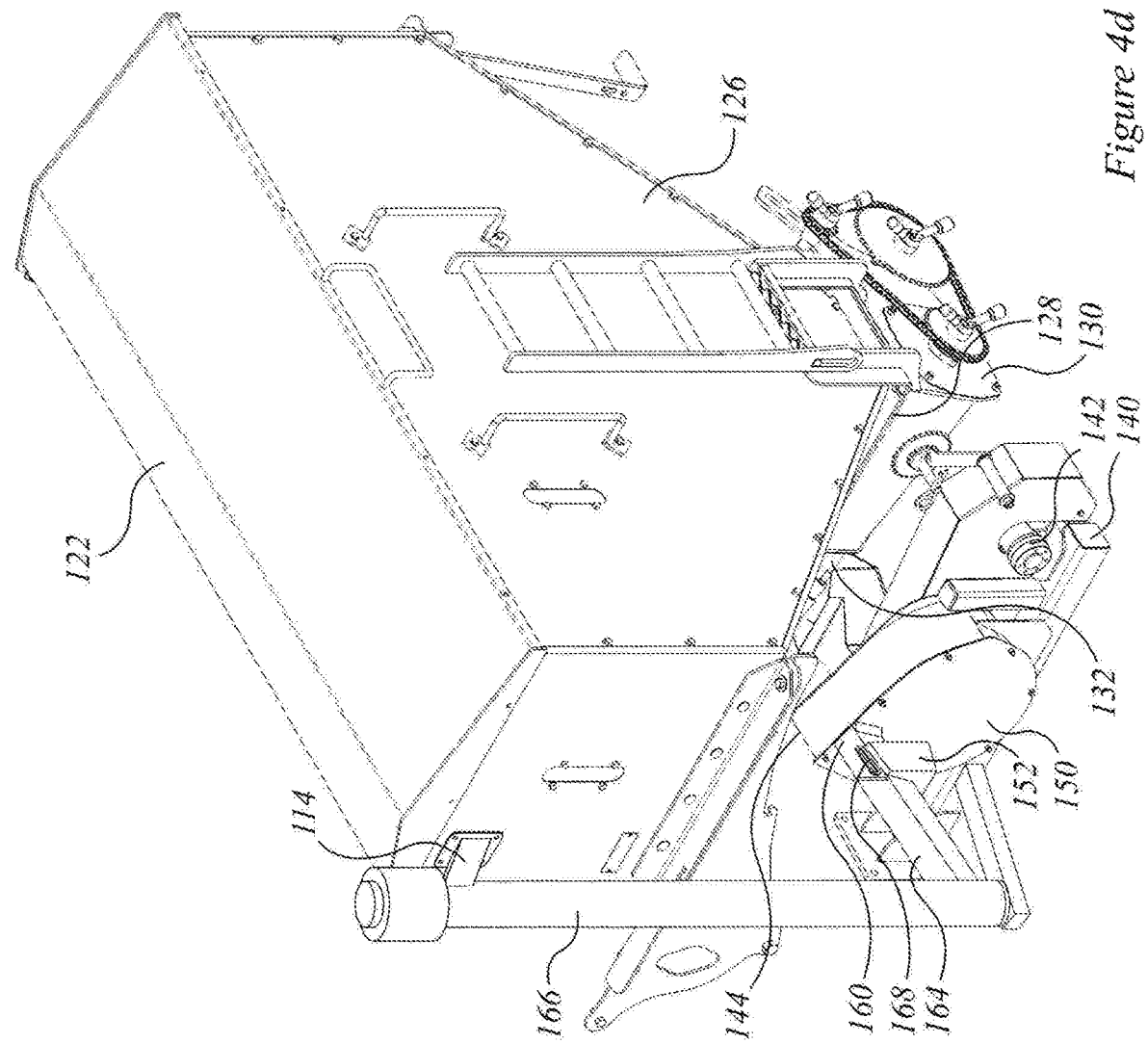
Figure 6A:
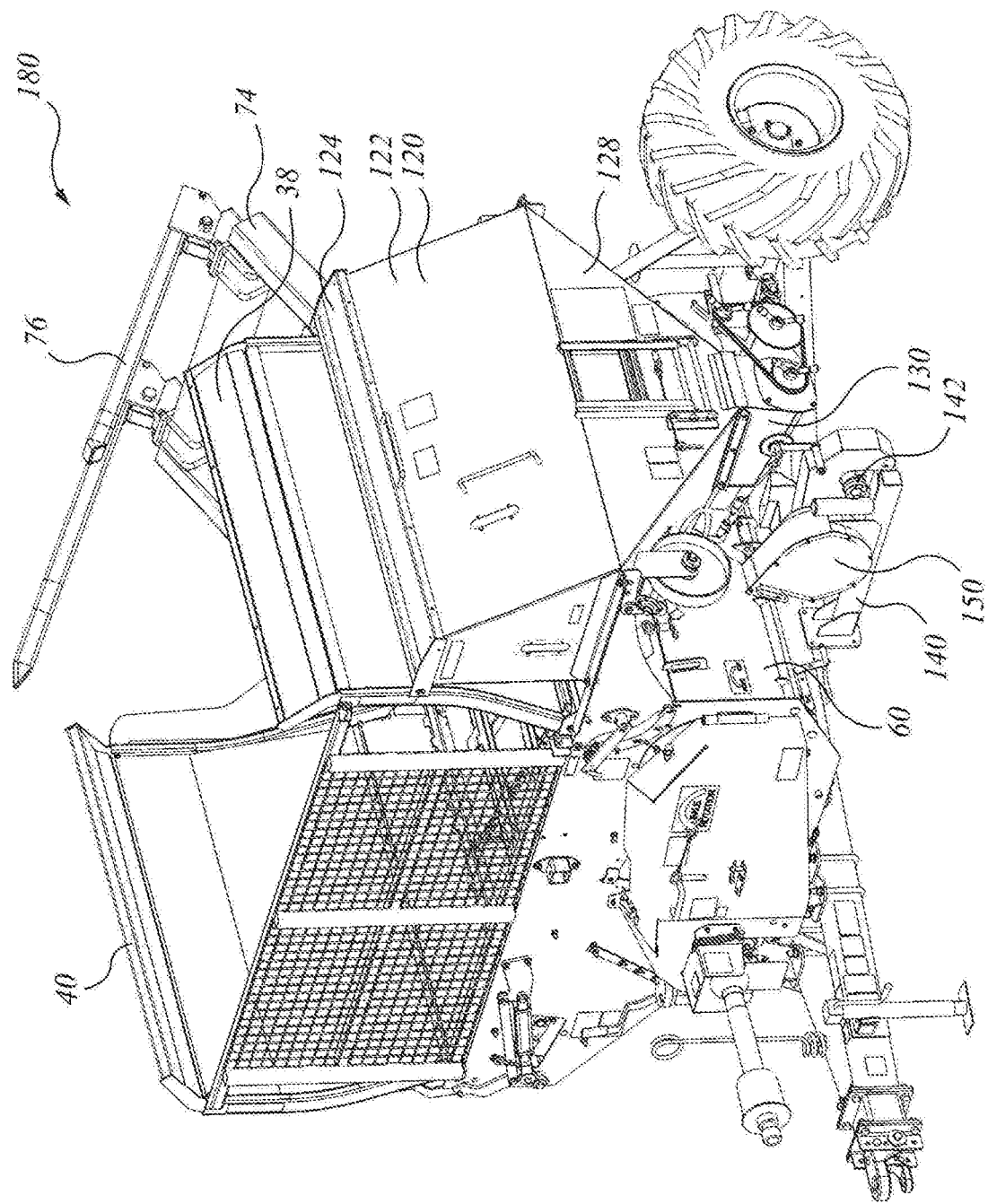
Figure 6B:
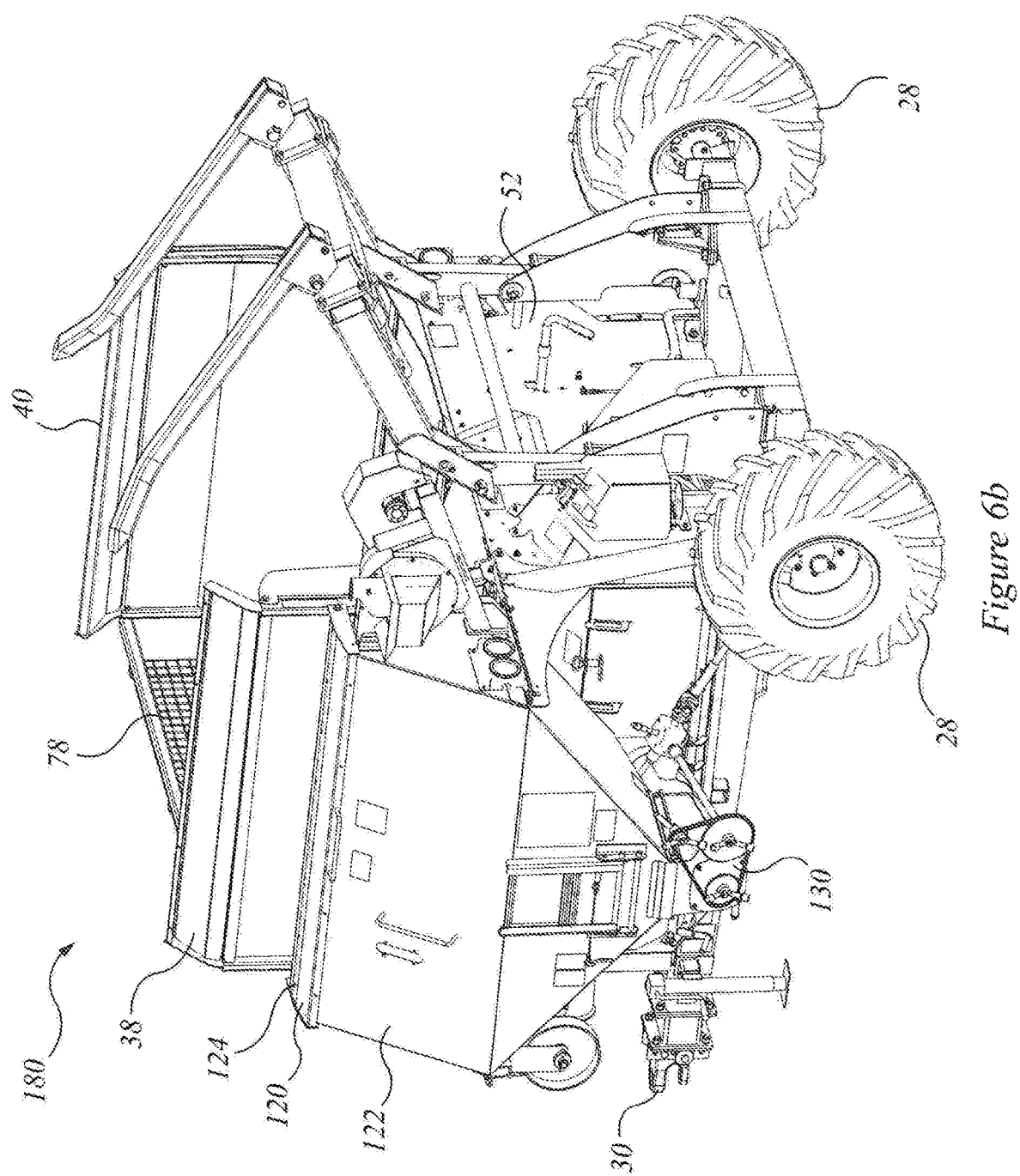
FIG. 6b is a perspective view of the bale processor of FIG. 6a from the left rear.
Figure 6C:
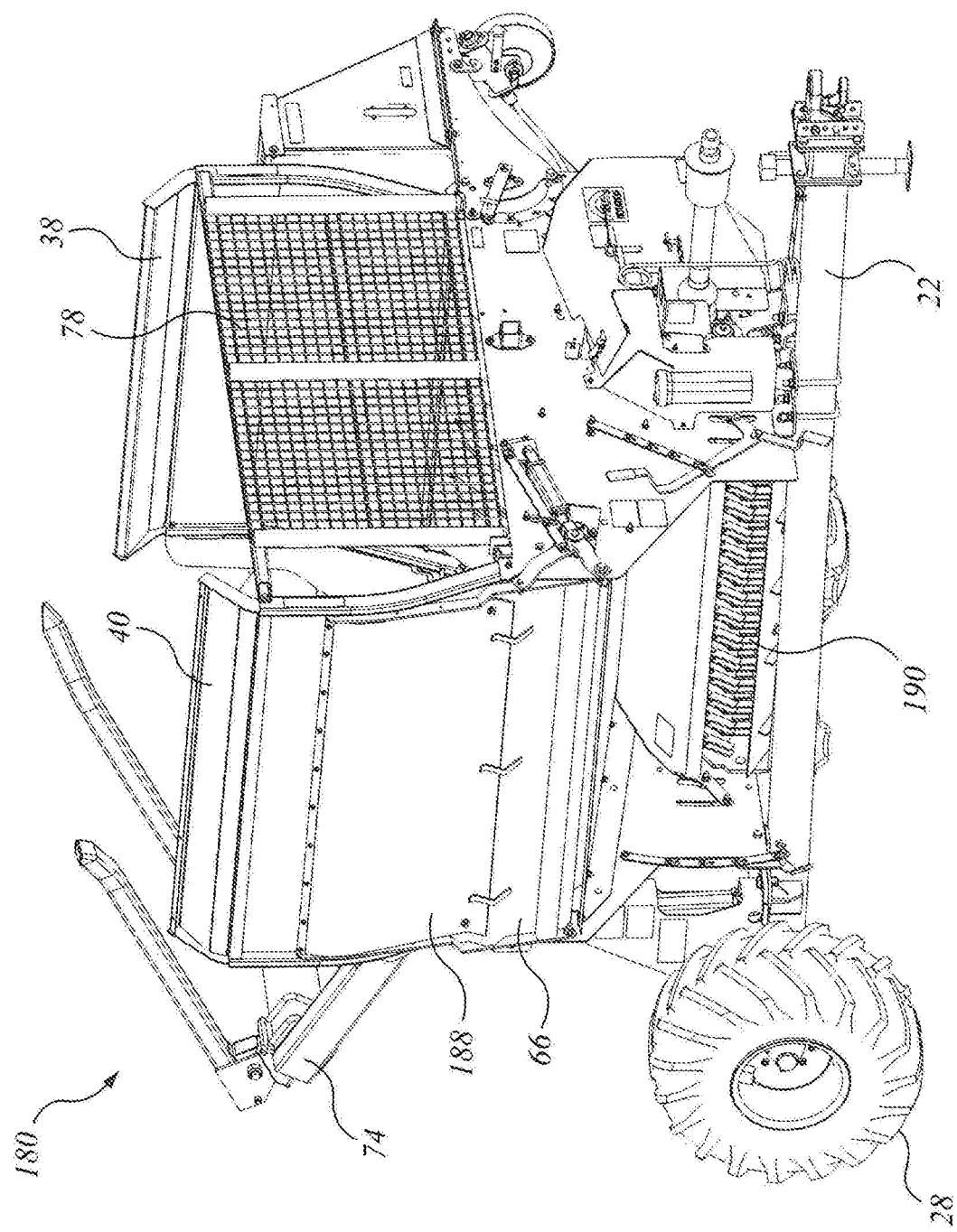
FIG. 6c is a perspective view of the bale processor of FIG. 6a from the right front.
Figure 6D:
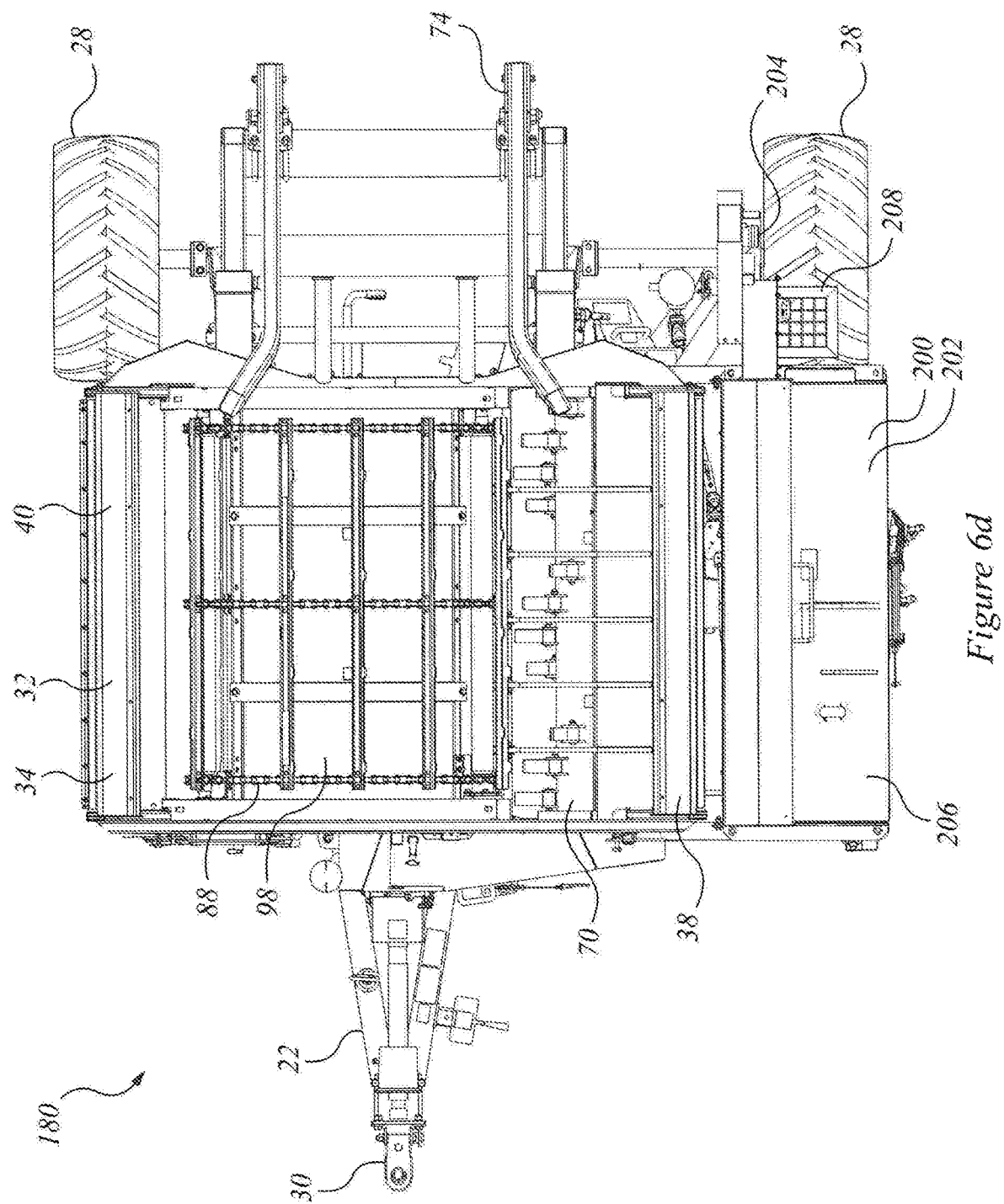
Figure 7A:
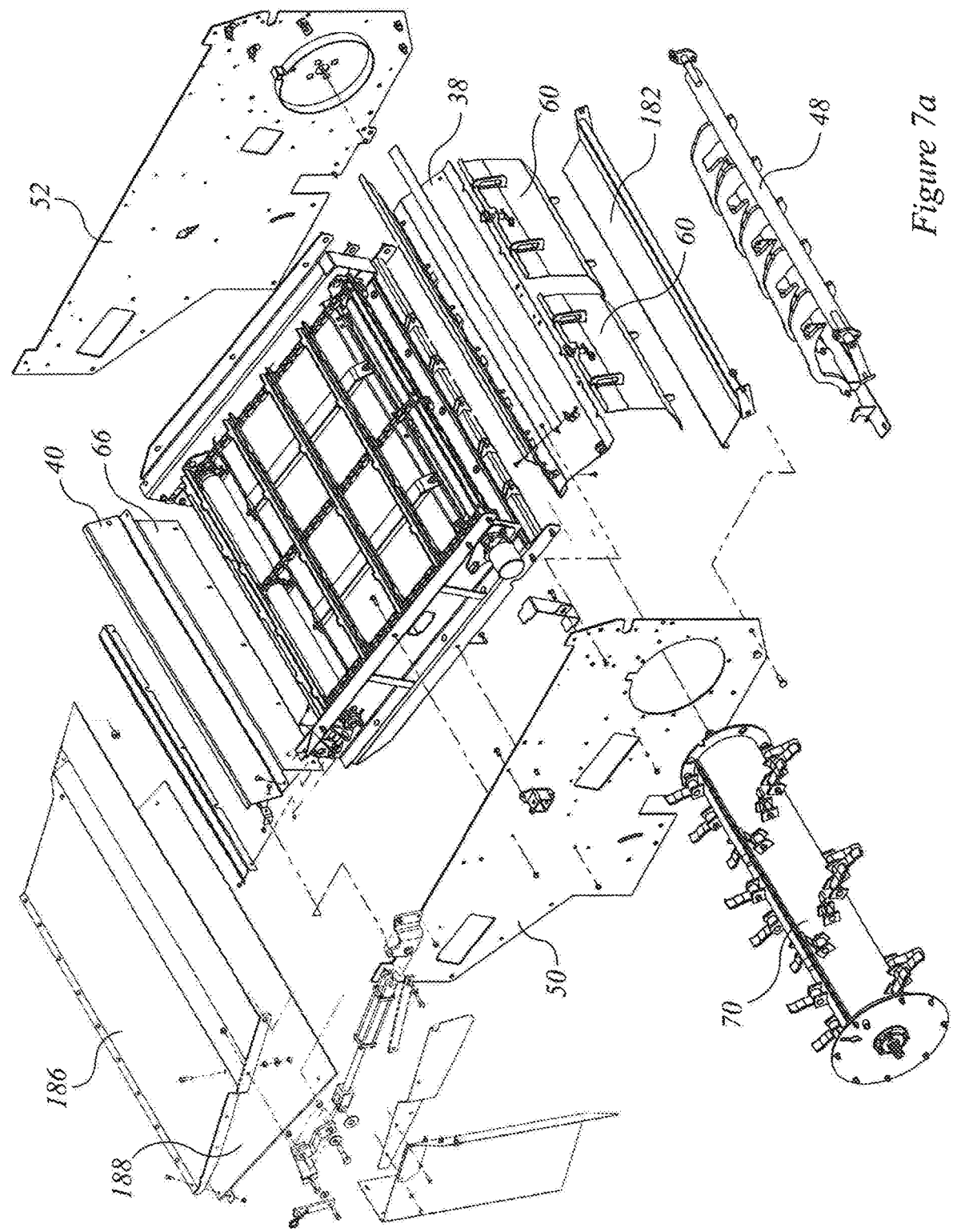
FIG. 7a is an exploded view of the body structure of the bale processor of FIG. 6a from the front left.
Figure 7B:
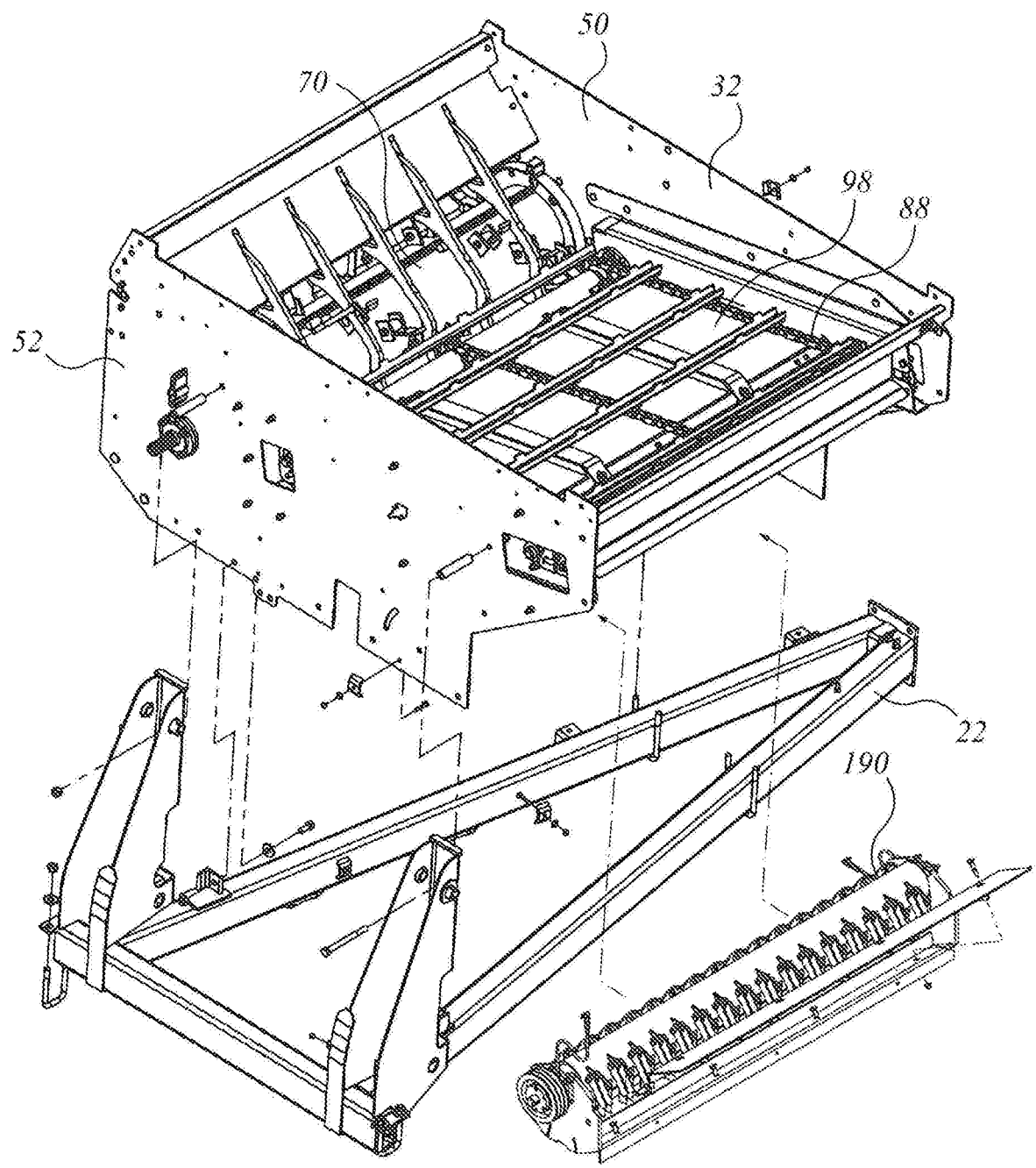
FIG. 7b is a partially exploded view of the processor of FIG. 6a from the rear right.
Figure 8A:
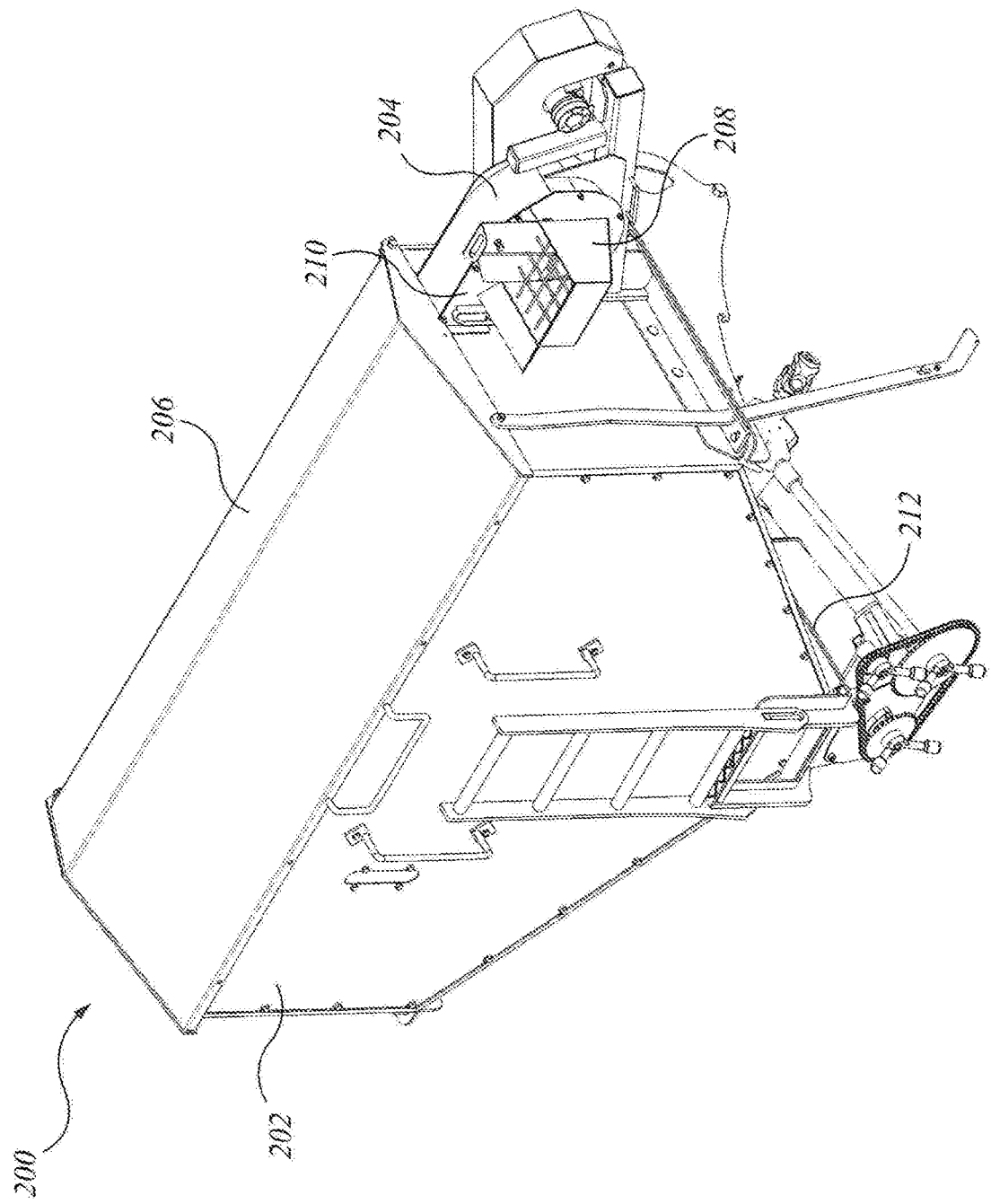
FIG. 8a is a perspective view of an alternate grain tank and grain cracker installation of FIG. 4a, from the left, and outboard.
Figure 8B:
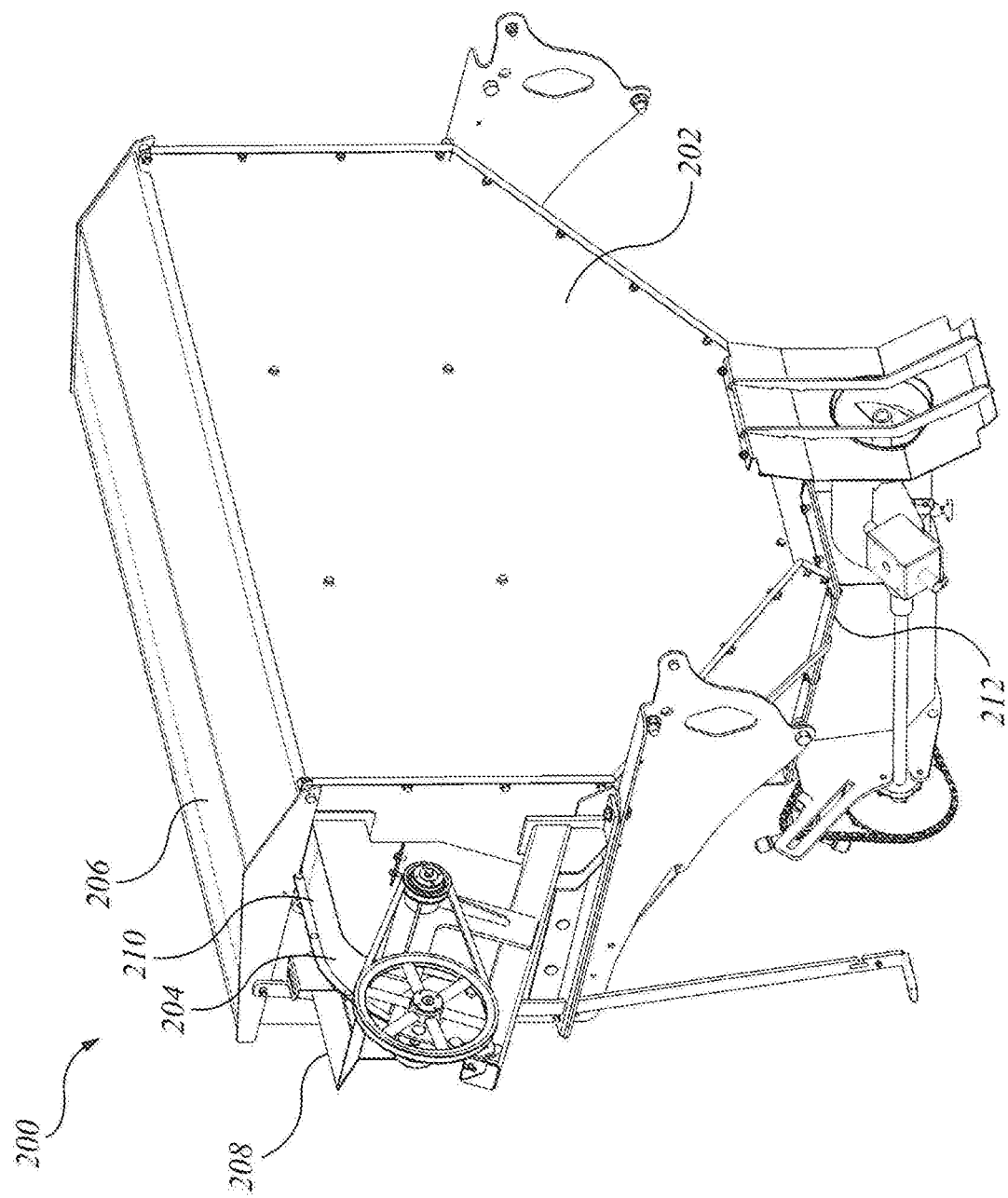
FIG. 8b is a perspective view of the grain tank installation of FIG. 8a from the right and inboard.
Figure 8C:
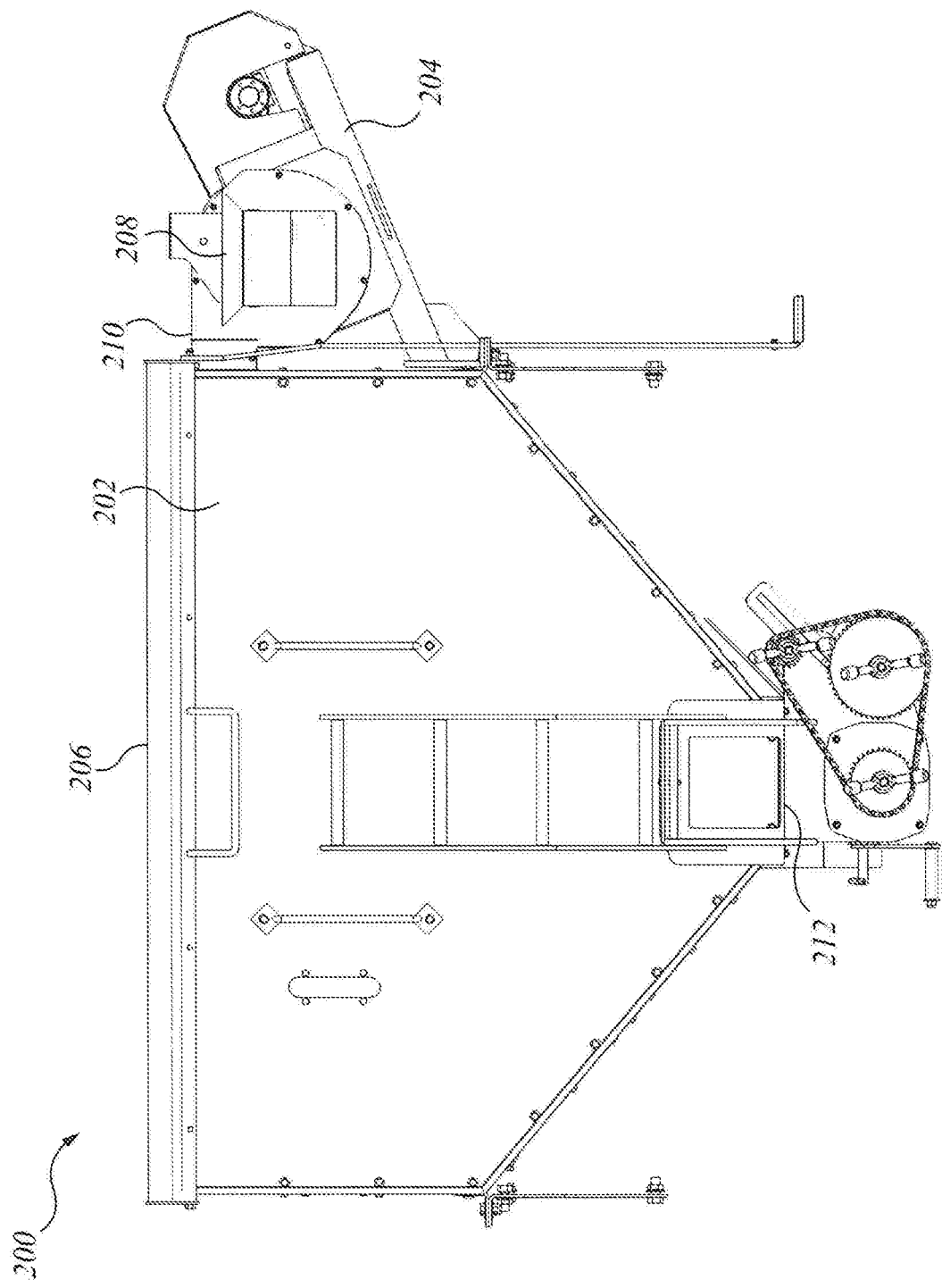
Figure 8D:
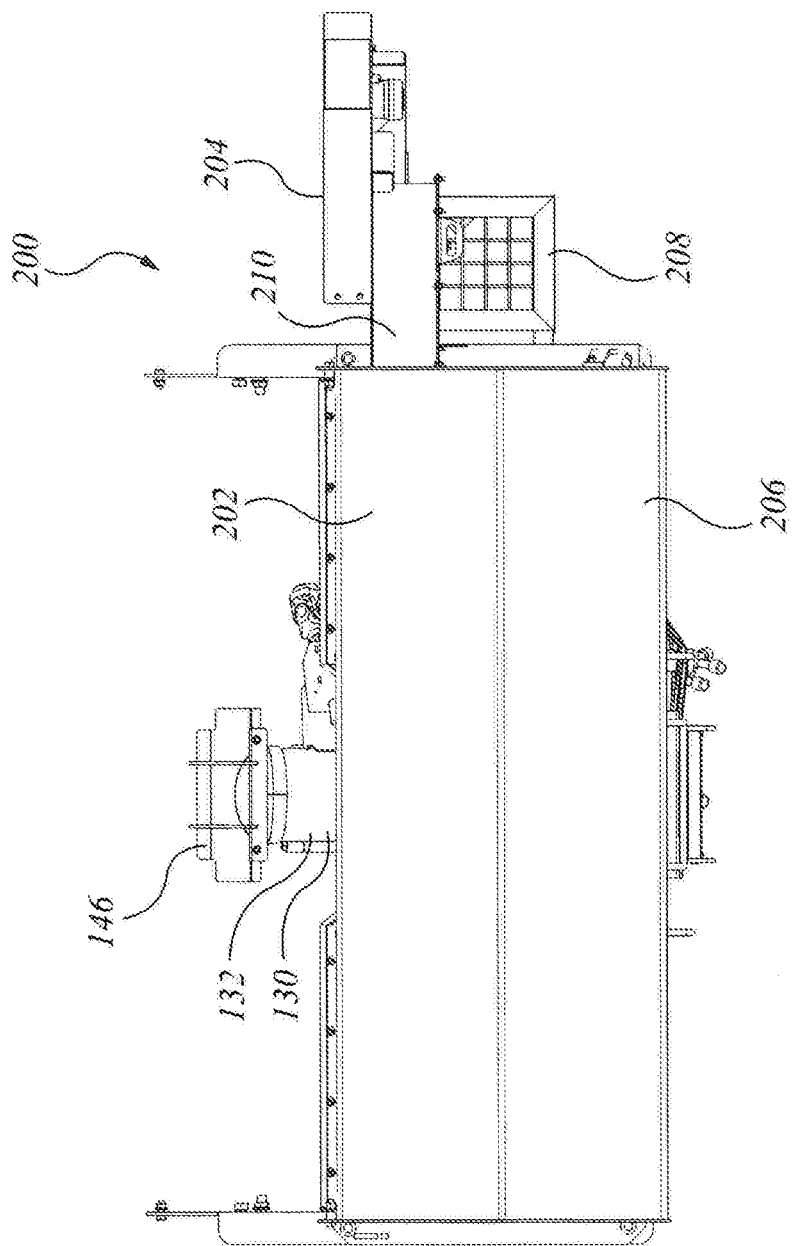

In an alternate operational mode of FIG. 4d, a discharge chute 164 may be mounted to catch cracked grain discharged from port 160. By choice of positions of valve, or gate, or vane 168, chute 152 may be blocked, and chute 164 opened to direct cracked grain to an elevator auger 166 that returns the cracked grain by chute 114 to the top of grain tank 122. In this mode, grain is drawn from the bottom of grain tank 122, cracked, and returned to the top of grain tank 122. The cracked grain may tend to lie predominantly on top of the un-cracked grain. As grain is metered out of grain tank 122, the lower, un-cracked grain will tend to be fed out first. Grain cracker 150 may then be run as a batch processor for such time as may be desired to pre-crack a portion or all of the grain in grain tank 122. When the grain has been pre-cracked, it may be fed through the cracker a second time and then into tub 34 while bale processor 20 is in motion, or, alternatively, having been pre-cracked, it may be directed through metering system 130 and then ducted directly into tub 34 without being passed though grain cracker 150 a second time.

Grain cracker 150 is driven by use of the tractor's hydraulic system. As such, grain cracker 150 can be run either alone or when the bale processor is running, or it may be idle while the bale processor is operating alone. In one embodiment, the speed of grain cracker 150 is adjustable independently of the rotational speed of flail drum 70, such that the speed of grain cracker 150, and therefore its throughput, corresponds to the output speed of metering system 130. It is convenient for tank 122, its access, and metering system 130 to be on the opposite side of bale processor 20 from the discharge outlet of bale processor 20.

The apparatus can operate in any of three modes. First, it can operate as a bale processor. Second, it can operate as a mixer, in which cracked grain is combined with shredded hay. Third, it can operate in a stationary mode to crack modest amounts of grain as may sometimes be desired. It is not necessary to stop the shredding of hay to operate the grain cracker. Both operations can occur at the same time. Further, it is not necessary to stop the machine and change screens or cutters for this purpose. If grain cracking is not desired, grain cracker 150 can be by-passed. The direct mixing of the grain output with the shredded hay output may tend to permit the user to avoid the need of a second grain storage tank for storage of the cracked grain.

Although feed choppers may also partially crack grain that may happen to be included in the feed mix to some extent, reliance on a feed chopper to crack grain may be a less than perfect solution. That is, the speed of the feed chopper to move a certain volume or weight of hay per unit time, and the average size of the feed produced by the feed chopper may not necessarily be the same as the desired fineness of the cracking of grain. The use of both a grain cracker, set at one rate of delivery (be it so many pounds of grain per distance of travel, for example), and one fineness (or coarseness) of grain cracking, and a feed chopper set for a different desired fineness or coarseness of chopped hay may be combined in operation.

Another embodiment of bale processor 180 is shown in FIGS. 6a-7b. Where bale processor 20 and bale processor 180 share the same parts, the same annotation numbers are used. In respect of the structural features of bale processor 180, reference may be had to the Highline Manufacturing CFR 651Bale Pro™ on-line parts manuals, which to any extent necessary or helpful in understanding this specification are incorporated herein by reference. Bale processor 180 has only one shredding tub. It is in many ways similar to bale processor 20, but rather than having a discharge auger 96 that carries the mix forward to feed chopper 100, bale processor 180 has a right hand discharge along the length of the right hand side of the tub.

That is, bale processor 180 has a bottom containment wall 182 that extends from flail drum 70 toward the right hand side of the machine. In some embodiments, bale processor 180 includes a feed chopper 190. Bale processor 180 has a rotating cylinder, or shaft, or flail drum 70 that tears material off of the bale, and transfers it to feed chopper 190. Feed chopper 190 has an array of knives or cutters or flails, 102, mounted around its circumference that cut the feed to size. The spinning operation of feed chopper 190 may tend to throw the feed a long distance. Bale processor 180 has a discharge door that may be set at an appropriate angle for discharge from feed chopper 190, or to bypass feed chopper 190 and to allow discharge due to the momentum imparted by the flails of flail drum 70. Bale processor 180 may have an extendible member such as curtain assembly that may include an upper deflector door 186 with a depending curtain 188, that hangs from the distal end of deflector door 186 to intercept the discharged mix, and to cause the feed to form in a windrow, rather than to be cast more broadly.

In this embodiment, grain tank 122, metering system 130, and grain grinder or grain cracker 150 are as before, but rather than grain being mixed as it moves along auger 96, grain enters bed 32 at one longitudinal location, and is fed laterally for side discharge. It is spread along the windrow by the advance of bale processor 180 as it is towed forward. Once again, the fineness, or coarseness, of the grain cracking is, or can be set to be, independent of the fineness, or coarseness, of the bale shredding or chopping. The various embodiments of the grain cracker described above in the context of bale processor 20 can also be used in bale processor 180.

An alternate embodiment of grain tank and grain cracker installation for use with either bale processor 20 or bale processor 180 is shown in FIGS. 8a to 8d, generally as 200. In this embodiment, grain tank 202 has greater depth in the transverse or y-direction than breadth in the longitudinal or x-direction. In this instance, grain cracker 204 is mounted on the aft-ward side, or end-face of grain tank 202. Grain tank 202 can be filled in the traditional manner by lifting lid 206. However, alternatively, grain cracker 204 has an intake chute, or funnel, indicated as 208, through which grain for carriage in tank 202 may be fed. The outlet, or discharge 210 of grain cracker 204 is mounted to the upper margin of the end wall. In this installation, metering system 130 is mounted to the bottom discharge 212 of tank 202, as before, and the output of metering system 130 is fed into tub 34.

To allow grains to be digested fully by livestock, the outer shell of the grain needs to be broken to allow the digestive enzymes of the livestock to penetrate the kernels. Currently the most common methods of preparing grains for feeding livestock are by using a hammer mill or a roller mill. The grain is transferred from a holding bin into the machine and then processed. Once processed, it is transferred to another bin. In the embodiments described above, the grain cracking apparatus is mounted directly onto the bale processor, adjacent to, or attached to, the grain tank. The cracking apparatus may either be fed from the tank's metering system, as in bale processors 20 and 180 and process the grain on demand; or be mounted near the top of the grain tank, thereby permitting grain to be processed while the tank is being loaded. This may tend to avoid the need for a second holding bin. Further, it may tend to be difficult to switch between different grains, since the conventional grain cracking approach tends to involve stationary equipment, or would presently require another tractor to move the mill and to provide power at different locations. Stationary grain mills are efficient, but are costly. As noted above, it is known that feed choppers provide some grain cracking, however, in the view of the inventor's experience with feed choppers, feed coppers have not been fully satisfactory in this regard. The feed chopper is typically not sized or optimized for grain cracking. By mounting the grain cracker mill on the bale processor, the proposed apparatus allows the grain cracker to be moved to any grain storage location. Grain cracker 150 is powered hydraulically using motive power from the tractor towing the bale processor. Mounting the grain cracker on the bale processor tends to increase the on-board processing capability and versatility of the unit as a whole.

Accordingly, as described above, there is a feed mixer, be it bale processor 20 or 180, or an alternate embodiment thereof. It has a mobile vehicular body that includes frame 22 and bed 32. It has a bale processor that includes tub 34 or 36, and flail drum 70, with suitable infeed and outfeed, the bale processor including a bale shredder located within said body, namely flail drum 70, and its associated flails and shrouds. A grain tank, such as grain tank 122, and a grain cracker 150 are mounted in series. The grain tank and grain cracker 150 are mounted to the body of bale processor 20 or 180, as may be, and are mobile therewith. The body, such as tub 34 has a grain inlet, namely the outlet of grain cracker 150, by which to receive cracked grain independently of loading of bales.

Grain cracker 150 is independently speed-adjustable relative to flail drum 70, relative to feed chopper 100, and relative to metering system 130. Grain cracker 150 may be adjusted to the linear advance speed of the vehicle; or to accept the maximum output flow of metering system 130, or as a function of PTO output shaft speed. As described, grain metering system 130 and grain cracker 150 are mounted in series. Grain cracker 150 is mounted downstream of grain tank 122, and upstream of the feed inlet to the bale processor.

Bale processors 20 and 180 are self-loading. Each of bale processors 20 and 180 may include an output chopper. The outlet of grain cracker 150 (or, equivalently, the grain input of tub 34) is mounted to tub 34 upstream of feed chopper 100 or 190, as may be. Each bed 32 has opposed left and right hand, sides. They discharge to one side, and grain cracker 150 is mounted to the other side. As noted, the grain cracker and the bale shredder are independently operable. In each case, where a feed chopper is mounted, the feed chopper is mounted downstream of the bale shredder. In the embodiment of FIG. 4d, grain cracker 150 has the option of discharging, or re-cycling, cracked grain back into grain tank 122 to permit partial or full pre-cracking of the grain prior to starting the towing operation, or while bale processor 20 or 180 is in motion, as, for example, when moving between the grain storage facility and the field.

As described, there is a towed bale processor, 20 or 180, having a grain cracker 150 and a feed chopper, 100 or 190. In each, grain cracker 150 is mounted upstream of the respective feed chopper. Bale processor 20 has a curtain assembly 106 mounted to intercept discharge and to form a windrow of the mixed materials of the discharge, e.g., the mixed shredded bale material and such feed supplement as may be, including the cracked grain, as said bale processor is towed. Bale processor 180 has a curtain assembly 186, 188, operable to the same end. In each of bale processors 20 and 180, the bale shredder, e.g., flail drum 70, is mounted upstream of the feed chopper, be it 100 or 190. In each case, discharge from grain cracker 150 is comingled, or mixed, with discharge from the bale shredder upstream of the respective feed chopper. In the case of bale processor 20, an auger 96 conveys comingled discharge from flail drum 70 and grain cracker 150 to feed chopper 100. In each case, the feed chopper discharges to a first side of said bale processor, and grain cracker 150 is mounted to the opposite side.

As described, bale processor 20, or 180, has a towing body or frame 22 and tub 34 or tubs 34 and 36 having a front, a rear, a first side and a second side. The towing body has at least a first tub 34, and may also have a second tub 36. A bale shredder is mounted within tub 34, and within tub 36 where used. There is a bale loader at the rear of the unit. The bale loader is used to load, or to advance, a bale into tub 34, (or tubs 34 and 36) for processing. The towing body has a side discharge whence mixed shredded material and cracked grain from tub 34 (or tubs 34 and 36) are deposited to form a windrow as the bale processor is towed. Grain cracker 150 and feed chopper 100 or 190 are independently operable. In bale processor 20, feed chopper 100 is longitudinally fed by auger and blower assembly 96. Feed chopper 100 has a discharge chute that discharges cross-wise or sideways, i.e., laterally to the side of the unit such that a windrow can be formed clear of the track of the unit. Feed chopper 190 is laterally fed by the sideways-thrown discharge from flail drum 70, and it laterally discharges to the side of the unit.

Although the various embodiments have been illustrated and described herein, the principles of the present invention are not limited to these specific examples which are given by way of illustration, but only by a purposive reading of the claims.

We claim:
1. A bale processor comprising:
a mobile frame;
a processor body mounted to the frame;
said bale processor including a bale shredder located within the processor body;
a grain tank, and a grain cracker mounted to receive grain material from the grain tank;
the grain tank and grain cracker supported by the frame and mobile therewith; and
the processor body having a grain inlet by which to receive cracked grain from the grain cracker independently of loading of bales into the processor body.

2. The bale processor of claim 1 wherein said grain cracker is independently speed-adjustable.

3. The bale processor of claim 1 further comprising a grain metering section for conveying grain material from the grain tank to the grain cracker.

4. The bale processor of claim 1 wherein said bale processor is self-loading.

5. The bale processor of claim 1 further comprising first and second opposed sides, wherein the bale processor discharges to said first side of the bale processor, and said grain cracker is mounted on said second side of the bale processor.

6. The bale processor of claim 1 wherein said grain cracker and said bale shredder are independently operable.

7. The bale processor of claim 1 further comprising a feed chopper having a chopper inlet connected to receive output from the bale shredder.

8. The bale processor of claim 1 wherein said grain cracker is operable in a recycling mode in which the grain cracker discharges cracked grain back into said grain tank, and a feed preparation mode in which the grain cracker discharges cracked grain into the processor body.

9. A bale processor comprising:
a towable frame mounted on wheels for travel over a ground surface, the frame having a travel direction when being towed, the bale processor being operable while being towed, said frame having a front, a rear, a first side and a second side;
a tub mounted to the frame, and a bale shredder mounted within said tub;
a bale loader mounted at said rear of said frame and operable to load a bale into said tub for processing by said bale shredder;
a grain tank, a grain metering system, and a grain cracker mounted to an exterior of said tub for cracking grain received from the grain tank and discharging cracked grain into said tub; and
a side discharge coupled to the frame for discharging mixed shredded material and cracked grain material from the tub and onto the ground surface for consumption by livestock.

10. The bale processor of claim 9 wherein said side discharge emanates from said first side of said frame, and said grain tank, said metering system, and said grain cracker are mounted at one of the second side and the rear of said frame.

11. The bale processor of claim 9 comprising a feed chopper mounted to receive mixed shredded material and cracked grain.

12. The bale processor of claim 11 wherein said grain cracker and said feed chopper are independently operable.

13. The bale processor of claim 11 wherein said feed chopper is laterally fed, and laterally discharging.

14. The bale processor of claim 9 wherein said bale processor has a discharge curtain assembly mounted downstream of the side discharge to form a windrow of the mixed shredded material and cracked grain material adjacent to said bale processor as said bale processor advances.

15. The bale processor of claim 14 comprising an auger mounted along a lower end of the tub for conveying the mixed shredded material and cracked grain material from the tub toward the side discharge.

16. The bale processor of claim 15, further comprising a feed chopper mounted downstream of the auger and upstream of the side discharge.

17. The bale processor of claim 9 wherein said grain cracker is operable in one mode to recycle cracked grain back to said grain tank for preparing a batch of pre-cracked grain prior to discharging the cracked grain into the tub.

18. The bale processor of claim 9, wherein the metering system comprises a grain auger having an upstream end for receiving grain material from the grain tank and a downstream end for delivering the grain material to the grain cracker.

19. A bale processor comprising:
a) a frame mounted on wheels for travelling over a ground surface;
b) a processor body mounted to the frame for receiving a feed bale, the processor body having a bale shredder mounted within the processor body for shredding the bale; and
c) a grain delivery system mounted on board the frame, the grain delivery system including a grain tank for holding a supply of whole grains, and a grain cracker for breaking whole grains received from the grain tank into cracked grain for improved digestion by livestock; and the processor body having a grain inlet by which to receive cracked grain from the grain cracker independently of loading of bales into the processor body.

20. The bale processor of claim 19, wherein the grain cracker includes a grain discharge outlet for discharging the cracked grain into the processor body for mixture with the shredded bale to form a combined feed ration.

21. The bale processor of claim 20, wherein the grain discharge outlet of the grain cracker comprises a blower for blowing the cracked grain from the grain cracker into the processor body.

22. The bale processor of claim 19, wherein the grain delivery system further comprises a grain metering system having an upstream end for receiving whole grains from the grain tank and a downstream end for delivering whole grains to an inlet of the grain cracker.

23. The bale processor of claim 22, wherein the grain metering system comprises a grain auger for conveying the whole grains from the upstream end to the downstream end, the grain auger powered by a grain metering system motor that is speed adjustable independently of the grain cracker.

24. The bale processor of claim 19, wherein the grain cracker is speed adjustable independently of the bale shredder for adjusting at least one of the size and concentration of the cracked grain in the combined feed ration.

25. The bale processor of claim 24, wherein the grain cracker comprises a housing extending between a grain cracker inlet and a grain cracker outlet spaced apart from the grain cracker inlet, and a cracker motor mounted external the housing for driving the grain cracker.

26. The bale processor of claim 25, wherein the grain cracker comprises a shaft mounted in the housing and coupled to the cracker motor, the shaft having one of milling rollers and milling hammers mounted to the shaft for breaking an outer shell of the whole grain fed into the grain cracker inlet.

* * * * *